(12) United States Patent
Ozawa

(10) Patent No.: US 8,747,172 B2
(45) Date of Patent: *Jun. 10, 2014

(54) WATER JET PROPULSION WATERCRAFT

(75) Inventor: Shigeyuki Ozawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,059

(22) Filed: Sep. 14, 2012

(65) Prior Publication Data

US 2013/0023167 A1    Jan. 24, 2013

Related U.S. Application Data

(63) Continuation of application No. 12/644,874, filed on Dec. 22, 2009, now Pat. No. 8,287,324.

(30) Foreign Application Priority Data

Apr. 8, 2009    (JP) ................................ 2009-093914

(51) Int. Cl.
*B63H 21/32* (2006.01)

(52) U.S. Cl.
USPC ........................................................ 440/89 B

(58) Field of Classification Search
USPC .... 440/89 H, 89 HE, 89 R, 89 B, 89 C, 89 E, 440/89 F, 89 J; 14/55.5, 55.51, 55.52, 55.53, 14/55.54, 55.56, 55.57, 55.58
See application file for complete search history.

(56) References Cited

U.S. PATENT DOCUMENTS

| | | | | |
|---|---|---|---|---|
| 6,010,378 A | * | 1/2000 | Fujimoto et al. | 440/89 R |
| 6,106,344 A | * | 8/2000 | Mashiko | 440/89 R |
| 6,213,827 B1 | * | 4/2001 | Hattori et al. | 440/89 R |
| 6,565,399 B2 | * | 5/2003 | Nakase et al. | 440/89 H |

FOREIGN PATENT DOCUMENTS

JP    2008157217 A  *  7/2008

OTHER PUBLICATIONS

Ozawa; "Water Jet Propulsion Watercraft"; U.S. Appl. No. 12/614,874, filed Dec. 22, 2009.
Morota et al.; "Water Jet Propulsion Watercraft"; U.S. Appl. No. 13/459,277, filed Apr. 30, 2012.

* cited by examiner

*Primary Examiner* — S. Joseph Morano
*Assistant Examiner* — Anthony Wiest
(74) *Attorney, Agent, or Firm* — Keating & Bennett, LLP

(57) ABSTRACT

A water jet propulsion watercraft includes a hull having a sealed engine room, an engine installed in the engine room, a jet propulsion unit arranged to be driven by the engine so as to suck in water from around the hull and jet the water, a saddle type seat disposed above the engine room, a first exhaust pipe, an exhaust pipe cooling unit, and a catalyst unit. The first exhaust pipe is attached to a side of the engine inside the engine room, extends rearward from the side of the engine, and is arranged to guide exhaust gas discharged from the engine. The exhaust pipe cooling unit is arranged to cool the first exhaust pipe. The catalyst unit is connected to the first exhaust pipe, is disposed inside the engine room so as to oppose a rear surface of the engine, and is arranged to promote reaction of components contained in the exhaust gas.

18 Claims, 15 Drawing Sheets

WATER JET PROPULSION WATERCRAFT

BACKGROUND OF THE INVENTION

1. Field of the Invention

The present invention relates to a saddle type water jet propulsion watercraft that includes a jet propulsion unit driven by an engine, and particularly relates to a water jet propulsion watercraft that includes a catalyst unit, which promotes reaction of exhaust gas from the engine.

2. Description of the Related Art

An exhaust apparatus of a small-scale marine vessel (water jet propulsion watercraft) according to a prior art is disclosed in U.S. Pat. No. 6,106,344. This exhaust apparatus includes an exhaust passage arranged to extend forward from one side of a two-stroke cycle engine and then curve from the front of the engine to the other side of the engine. The exhaust apparatus further includes a catalyst connected to the exhaust passage at a rear portion of the other side of the engine. The exhaust passage is thus disposed so as to surround both sides and the front of the engine, and the catalyst is connected to this exhaust passage.

SUMMARY OF THE INVENTION

The inventor of preferred embodiments of the present invention described and claimed in the present application conducted an extensive study and research regarding a water jet propulsion watercraft, such as the one described above, and in doing so, discovered and first recognized new unique challenges and previously unrecognized possibilities for improvements as described in greater detail below.

That is, it was discovered that although the exhaust apparatus according to the prior art described above is well applied to a two-stroke cycle engine, challenges arise in application to a water jet propulsion watercraft that includes a four-stroke cycle engine, which is higher in combustion efficiency.

To explain more specifically, in a water jet propulsion watercraft, an engine room is sealed to prevent entry of water. The engine room below a saddle type seat is disposed between both legs of a crew or passengers sitting with their legs straddled and is thus extremely restricted in lateral width. An inside of the engine room is thus a narrow, sealed space, and cooling of an exhaust pipe is essential for preventing increases in air intake temperature to prevent a decrease in output. The exhaust temperature is thus lowered by the time the exhaust gas reaches the catalyst unit. Also, in a four-stroke cycle engine, the amounts of fuel and oxygen contained in the exhaust are low. Combustion in a catalyst unit thus does not occur readily and activation of the catalyst is difficult, especially immediately after starting.

With the abovementioned prior-art (U.S. Pat. No. 6,106,344) that is provided with the two-stroke cycle engine, the above problems do not occur, and fuel and oxygen are contained abundantly in the exhaust gas and the catalyst is activated readily. As a matter of fact, it is preferable to secure an exhaust passage of not less than a certain length from the engine to the catalyst in order to secure horsepower (output). Thus, although the arrangement of the prior art does not present a problem when premised on use of a two-stroke cycle engine, adequate activation of the catalyst may not be achieved when the prior art is applied to a saddle type water jet propulsion watercraft with a four-stroke cycle engine.

That is, with the exhaust apparatus of the prior art, the catalyst is connected to the exhaust passage that is disposed so as to surround both sides and the front of the engine. The distance of the path from the engine to the catalyst is thus long. There may thus be a case where the exhaust gas, discharged from the engine, cannot be made to flow into the catalyst in a state where the temperature is maintained at a high temperature.

In particular, with a water jet propulsion watercraft including a structure in which the exhaust passage is cooled, the temperature of the exhaust gas drops readily. Thus, when the distance of the path from the engine to the catalyst is long, the temperature of the exhaust gas drops by the time it reaches the catalyst and the catalyst is not activated sufficiently. Consequently, it may not be possible to make components (HC, CO, NOx, etc.), which are contained in the exhaust gas, react sufficiently by the catalyst.

In order to overcome the previously unrecognized and unsolved challenges described above, a preferred embodiment of the present invention provides a water jet propulsion watercraft that includes a hull having a sealed engine room, an engine installed in the engine room, a jet propulsion unit arranged to be driven by the engine to suck in water from around the hull and jet the water, a saddle type seat disposed above the engine room, a first exhaust pipe, an exhaust pipe cooling unit, and a catalyst unit. The first exhaust pipe is attached to a side of the engine inside the engine room, extends rearward from the side of the engine, and is arranged to guide exhaust gas discharged from the engine. The exhaust pipe cooling unit is arranged to cool the first exhaust pipe. The catalyst unit is connected to the first exhaust pipe, is disposed inside the engine room so as to oppose a rear surface of the engine, and is arranged to promote reaction of components contained in the exhaust gas.

It is preferred that the engine is a four-stroke cycle engine, for example, to fully realize the unique advantages of preferred embodiments of the present invention.

With the unique structure described above, the first exhaust pipe extends to the rear of the engine from the side of the engine and is coupled to the catalyst unit disposed opposite the rear surface of the engine. An exhaust passage length from the engine to the catalyst unit is thereby shortened. Consequently, the exhaust gas of high temperature can be guided to the catalyst unit and the catalyst unit can thus be activated rapidly after starting of the engine. Hazardous components (for example, HC, CO, NOx, etc.) contained in the exhaust from the four-stroke cycle engine that is low in fuel and oxygen contents can thereby be reacted sufficiently by the catalyst unit and be cleaned up (detoxified) efficiently. Moreover, the catalyst unit is disposed opposite the rear surface of the engine, and a center of gravity of the water jet propulsion watercraft can thereby be positioned readily at a hull center in regard to a right/left direction and toward the rear in regard to a front/rear direction. A water jet propulsion watercraft that is excellent in balance in the right/left direction can thereby be provided. Both cooling of the first exhaust pipe and activation of the catalyst unit can thus be achieved at the same time inside the engine room with the sealed structure of narrow width. In addition, a relatively low or light weight is achieved at the same time because the first exhaust pipe is short and is light in weight accordingly. Also, the need to enlarge the engine room in the right/left direction is eliminated because the catalyst unit is disposed to the rear of the engine.

Preferably, the catalyst unit is arranged to extend in a width direction of the hull in a region that opposes the rear surface of the engine. By this arrangement, an installation space of the catalyst unit can be prevented from becoming large in the front/rear direction in comparison to a case of disposing the catalyst unit so as to extend in the front/rear direction of the hull. Consequently, the engine can be disposed more to the rear. The center of gravity can thereby be disposed more to the rear, thereby improving the motion performance of the water jet propulsion watercraft.

Preferably, the water jet propulsion watercraft further includes a water cooling unit, arranged to surround a periphery of the catalyst unit and cooling the catalyst unit by water. By this arrangement, the catalyst unit can be prevented from becoming high in temperature due to the exhaust gas discharged from the engine. An inside of the hull can thus be prevented from heating up.

Preferably, the engine also includes a cylinder head having an exhaust port connected to the first exhaust pipe, and at least a portion of the catalyst unit is arranged so as to oppose a rear surface of the cylinder head. By this arrangement, the catalyst unit can be disposed at substantially the same height as the cylinder head that includes the exhaust port. The first exhaust pipe can thereby be disposed so as to extend rearward substantially horizontally from the exhaust port, and the first exhaust pipe can thus be made shorter.

Preferably, in this case, the catalyst unit is disposed at substantially the same height as the exhaust port of the cylinder head. By this arrangement, the first exhaust port can readily be disposed to extend rearward substantially horizontally from the exhaust port.

Preferably, the water jet propulsion watercraft further includes a second exhaust pipe connected to the catalyst unit and arranged to guide the exhaust gas that has been discharged from the engine and has passed through the first exhaust pipe and the catalyst unit, and a water lock connected to a downstream side of the second exhaust pipe. The water lock is arranged to prevent water, which enters from an exhaust opening that releases the exhaust gas to an outside, from flowing in toward the engine side. Preferably, a lower portion of the water lock is disposed below a lower portion of the catalyst unit. By this arrangement, the catalyst unit is disposed at a higher position than the water lock and water retained in the water lock can thus be prevented from flowing into the catalyst unit. "Downstream side" signifies the downstream side on the basis of the flow of the exhaust.

Preferably, the second exhaust pipe includes a double pipe structure that includes an inner pipe and an outer pipe and a cooling water passage is defined between the inner pipe and the outer pipe. Also preferably, the water lock has an exhaust pipe connection portion arranged to be coupled to the second exhaust pipe. Preferably, an exit end of the outer pipe is coupled to the exhaust pipe connection portion, and an exit end portion of the inner pipe is inserted through the exhaust pipe connection portion and protrudes inward relative to an inner wall surface of the water lock. Preferably, the exhaust pipe connection portion and an outer surface of the inner pipe define a cooling water introduction opening that introduces cooling water, guided through the cooling water passage, into the water lock.

By this arrangement, the exit end portion of the inner pipe, through which the exhaust gas passes, protrudes inward relative to the inner wall surface of the water lock and thus a distance from the cooling water introduction opening to the exit end portion of the inner pipe is long. The cooling water is thus unlikely to enter the inner pipe and back flow of the cooling water into the catalyst unit can thereby be prevented.

Preferably, the exit end of the inner pipe widens as it extends toward the downstream side. Back flow of the cooling water into the catalyst unit can thereby be prevented more reliably. The exit end of the inner pipe may widen outward in a bell mouth shape, for example. The back flow of the cooling water can thereby be prevented even more effectively.

When the engine is disposed as far rearward as possible to dispose the center of gravity to the rear, the second exhaust pipe, which forms the exhaust passage between the catalyst unit and the water lock that are disposed to the rear of the engine, is made short in pipe length. The cooling water at the second exhaust pipe thus may flow back into the catalyst unit. If the back flow of the cooling water is permitted, it leads to breakage of the catalyst unit and breakage of related components (for example, an oxygen concentration sensor). It is thus preferable to take cooling water back flow countermeasures, such as those mentioned above. Breakage of the catalyst unit and the related components due to back flow water can thereby be prevented while disposing the catalyst unit at the rear of the engine and disposing the center of gravity (engine) at the rear.

Preferably, the water jet propulsion watercraft further includes a supporting member fixed to the engine and supporting the catalyst unit. By this arrangement, the catalyst unit can be vibrated in synchronization with the engine. Consequently, repeated application of load to the first exhaust pipe, which is connected to the engine, and connection portions of the catalyst unit and the first exhaust pipe, etc., can be prevented.

Preferably, in this case, the water jet propulsion watercraft further includes an elastic member that lowers vibration during driving of the engine, and the catalyst unit is supported on the supporting member via the elastic member. By this arrangement, by use of the elastic member, the vibration during the driving of the engine can be attenuated before it is transmitted to the catalyst unit, and the vibration of the catalyst unit can thus be reduced.

Preferably, the first exhaust pipe does not include a portion that inclines upward toward the downstream side. By this arrangement, the formation or accumulation of condensed water in the first exhaust pipe can be prevented, and the water content in the exhaust gas is passed through the catalyst unit in the state of water vapor. Breakage of the catalyst unit and related components can thereby be prevented.

Preferably, the first exhaust pipe is coupled to the catalyst unit upon extending horizontally rearward from the side of the engine. By this arrangement, the exhaust gas path length between the engine and the catalyst unit can be made short and, at the same time, the formation or accumulation of condensed water in the first exhaust pipe can be prevented.

Preferably, the water jet propulsion watercraft further includes a second exhaust pipe connected to the catalyst unit and arranged to guide the exhaust gas that has been discharged from the engine and has passed through the first exhaust pipe and the catalyst unit, and the second exhaust pipe does not include a portion that inclines upward toward the downstream side. By this arrangement, water that is formed by the reaction of the components (for example, HC, CO, NOx, etc.) contained in the exhaust gas in the catalyst unit can be made to flow out to the downstream side of the second exhaust pipe. Retention of water in the catalyst unit can thereby be prevented.

Preferably, in this case, the second exhaust pipe is arranged to incline downward toward the downstream side. By this arrangement, the water that forms or accumulates in the catalyst unit can be made to flow out toward the downstream side more smoothly from the second exhaust pipe. Back flow of the water into the catalyst unit can thereby be prevented.

Preferably, the water jet propulsion watercraft further includes a second exhaust pipe connected to the catalyst unit and arranged to guide the exhaust gas that has been discharged from the engine and has passed through the first exhaust pipe and the catalyst unit, the first exhaust pipe is coupled to the catalyst unit upon extending horizontally rearward from the side of the engine, and the second exhaust pipe is arranged to incline downward toward the downstream side. By this arrangement, the exhaust gas path length from the engine to the catalyst unit can be shortened, the formation or accumulation of condensed water in the first exhaust pipe can be prevented, and the back flow of the condensed water or the cooling water into the catalyst unit from the second exhaust pipe side can also be prevented.

Preferably, the engine includes a crankshaft arranged to extend in the front/rear direction, and the catalyst unit is arranged such that at least a portion thereof overlaps with a rear end portion of the crankshaft in plan view. By this arrangement, the catalyst unit can be disposed at a position that is not excessively separated from the rear surface of the engine. An installation region of the engine and the catalyst unit can thereby be made compact.

Preferably, the hull includes a partition plate arranged to partition an inside of the hull in a front/rear direction, and the catalyst unit is disposed between the engine and the partition plate so as to oppose a rear surface of the engine. By this arrangement, a region between the engine and the partition plate can be used effectively to install the catalyst unit.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

An arrangement of a water jet propulsion watercraft according to a first preferred embodiment of the present invention shall now be explained with reference to FIG. 1 to FIG. 9. In the figures, FWD indicates a forward drive direction of the watercraft, and BWD indicates a reverse drive direction of the watercraft.

Figure 1:
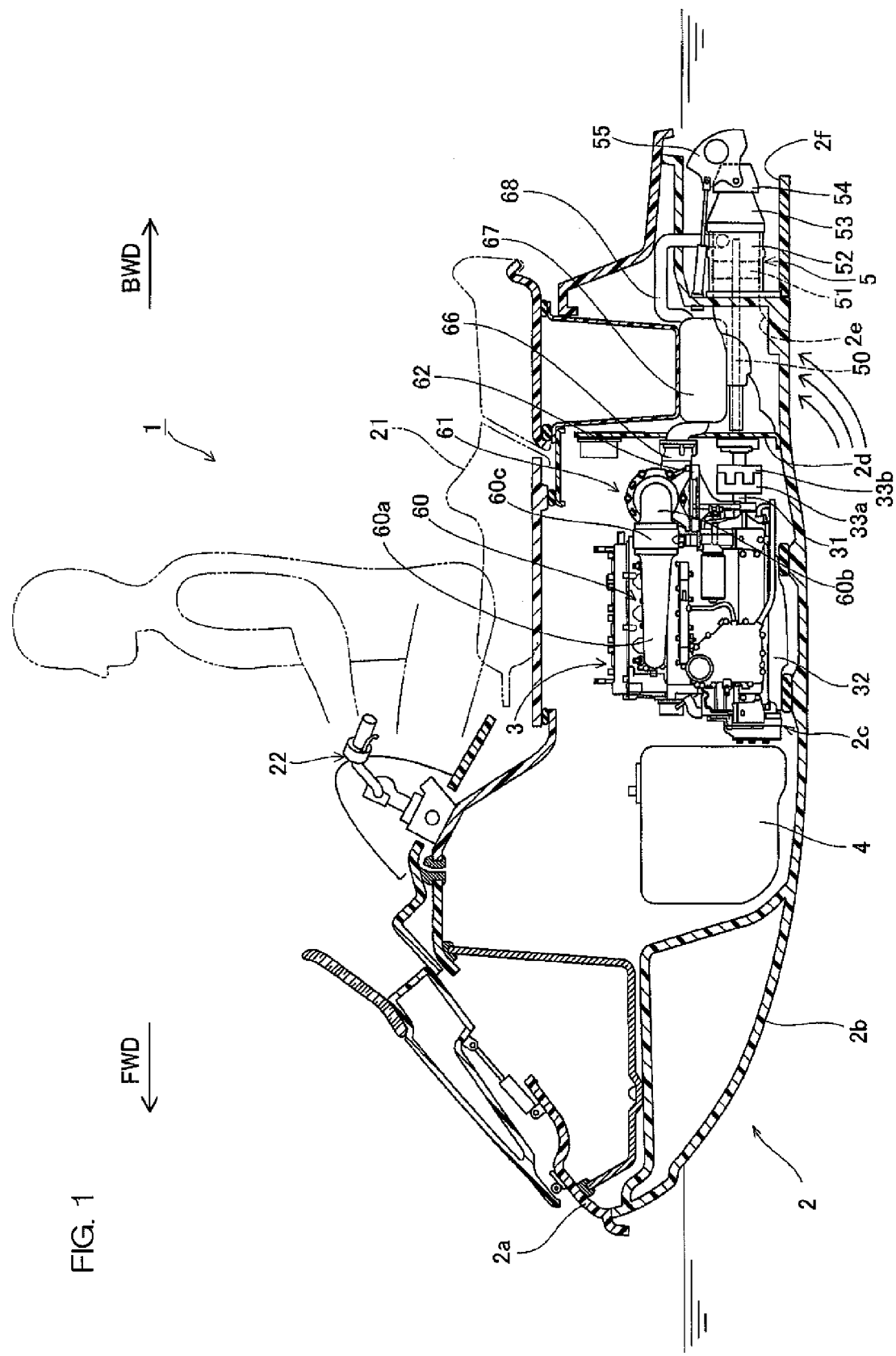
FIG. 1 is a sectional view of an overall arrangement of a water jet propulsion watercraft according to a first preferred embodiment of the present invention.

FIG. 1 is a sectional view of an overall arrangement of the water jet propulsion watercraft according to the first preferred embodiment of the present invention. The water jet propulsion watercraft 1 includes a hull 2, an engine 3 housed in an inside of the hull 2, a jet propulsion unit 5 arranged to be driven by the engine 3, and a catalyst unit 61 arranged to purify an exhaust gas of the engine 3. The hull 2 includes a deck 2a and a hull body 2b. A sealed engine room 2c, arranged to house the engine 3, a fuel tank 4, etc., is provided in the inside of the hull 2. A partition plate 2d, extending vertically upward from a bottom portion of the hull body 2b, is provided at a rear portion of the inside of the hull 2. The partition plate 2d is arranged to partition the inside of the hull 2 in a front/rear direction and prevent the occurrence of rolling, which is a phenomenon by which the hull 2 is twisted about an axis extending in the front/rear direction.

On the deck 2a, a seat 21 is provided above the engine 3. A steering mechanism 22 arranged to steer the hull 2 is disposed in front of the seat 21.

The engine 3 preferably is a serial four-cylinder, four-stroke cycle engine, for example, and a crankshaft 31 is disposed so as to extend in the front/rear direction (FWD arrow direction and BWD arrow direction). The engine 3 includes a crankcase 32 that holds the crankshaft 31. A pair of couplings 33a and 33b are located at the rear of the crankshaft 31. The couplings 33a and 33b connect the crankshaft 31 and the impeller shaft 50, and are arranged to transmit rotation of the crankshaft 31 to the impeller shaft 50.

The jet propulsion unit 5 includes the impeller shaft 50, an impeller 51, an impeller housing 52, a nozzle 53, a deflector 54, and a bucket 55. The impeller shaft 50 is arranged to extend rearward through the partition plate 2d from the engine room 2c. A vicinity of a rear end portion of the impeller shaft 50 passes through a water suction portion 2e of the hull 2 and is led into the impeller housing 52, which is to be described below and is provided at a rear portion of the hull 2.

The impeller 51 is attached to the vicinity of the rear end portion of the impeller shaft 50. The impeller 51 is disposed in an inside of the impeller housing 52, which is connected to a rear portion of the water suction portion 2e. The impeller 51 is arranged to rotate together with the impeller shaft 50, suck in water below a water surface from the water suction portion 2e, and jet the water rearward from the nozzle 53 disposed to the rear of the impeller housing 52. The impeller housing 52 and the nozzle 53 are provided at an outer side of the hull 2 and are arranged to be capable of jetting water to the rear. Also, the deflector 54 is provided to the rear of the nozzle 53. The deflector 54 is arranged to convert a direction of the water jet flow, jetted rearward from the nozzle 53, to right and left directions. The bucket 55 is located at the rear of the deflector 54. The bucket 55 is arranged to convert forward a jetting direction of the water, jetted rearward from the nozzle 53 and the deflector 54.

Figure 2:
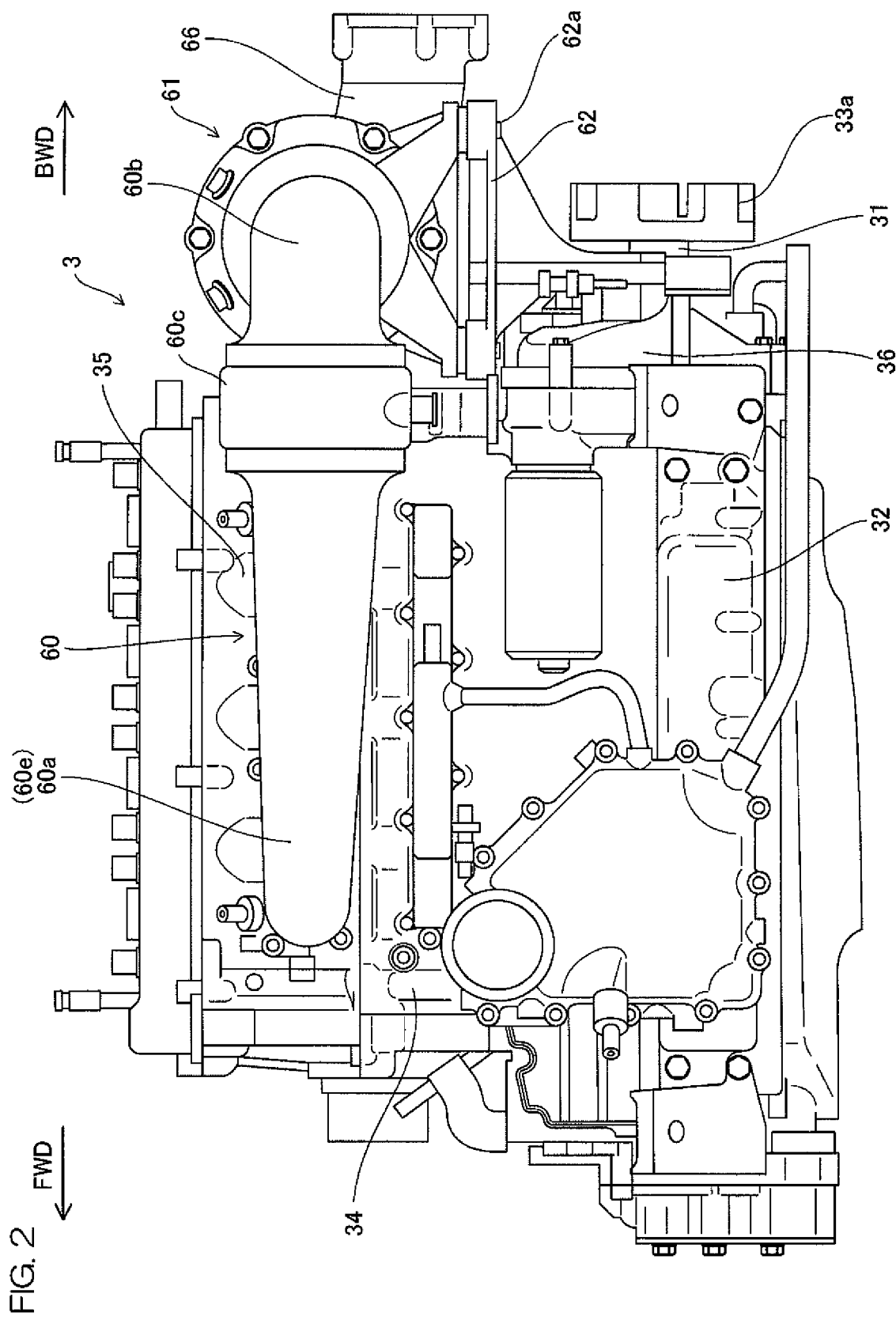
FIG. 2 is a side view for explaining a structure in a vicinity of an engine and a catalyst unit of the water jet propulsion watercraft according to the first preferred embodiment shown in FIG. 1.
Figure 3:
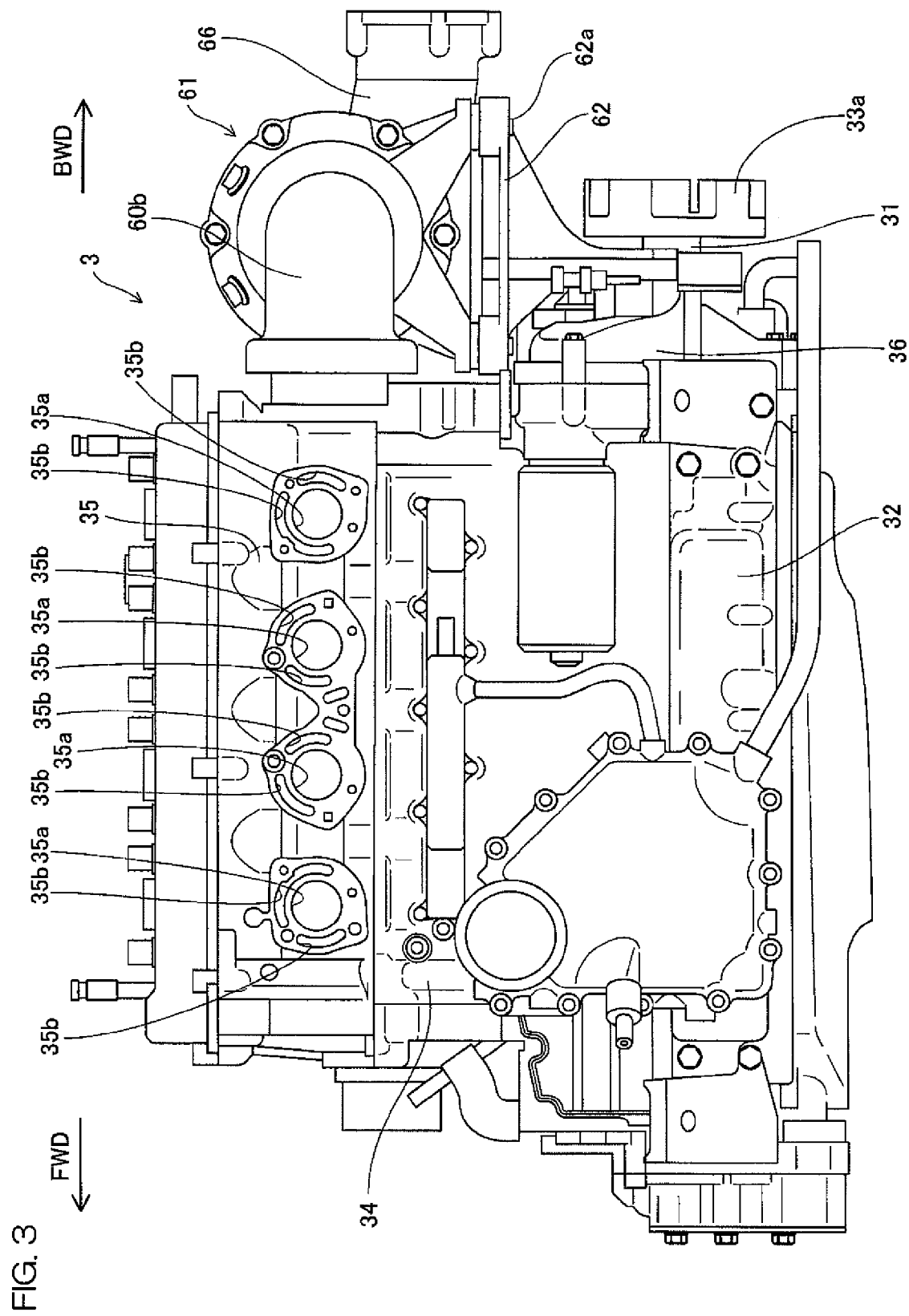
FIG. 3 is a side view of a structure of a cylinder head of the engine of the water jet propulsion watercraft according to the first preferred embodiment shown in FIG. 1.

FIG. 2 is a side view for explaining a structure in a vicinity of the engine 3 of the water jet propulsion watercraft 1. In addition, FIG. 3 is a side view of a state where an exhaust manifold is removed to explain a structure of a cylinder head of the engine 3. Cylinders 34 and a cylinder head 35 are provided above the crankcase 32 of the engine 3. As shown in FIG. 3, the cylinder head 35 preferably includes four exhaust ports 35a arranged to discharge exhaust gas, generated by combustion of fuel gas in an inside of the engine 3, to an outside of the engine 3. The exhaust ports 35a are respectively opened so as to be oriented toward a side of the engine 3.

Water flow channels 35b are respectively provided at peripheries of the exhaust ports 35. Water, pumped by a water pump (not shown) of the engine 3, flows through the water flow chambers 35b. The water flow channels 35b are respectively arranged to be connectable to a water jacket portion 60f of an exhaust manifold unit 60 to be described below and are arranged to make water flow into the water jacket portion 60f.

Figure 4:
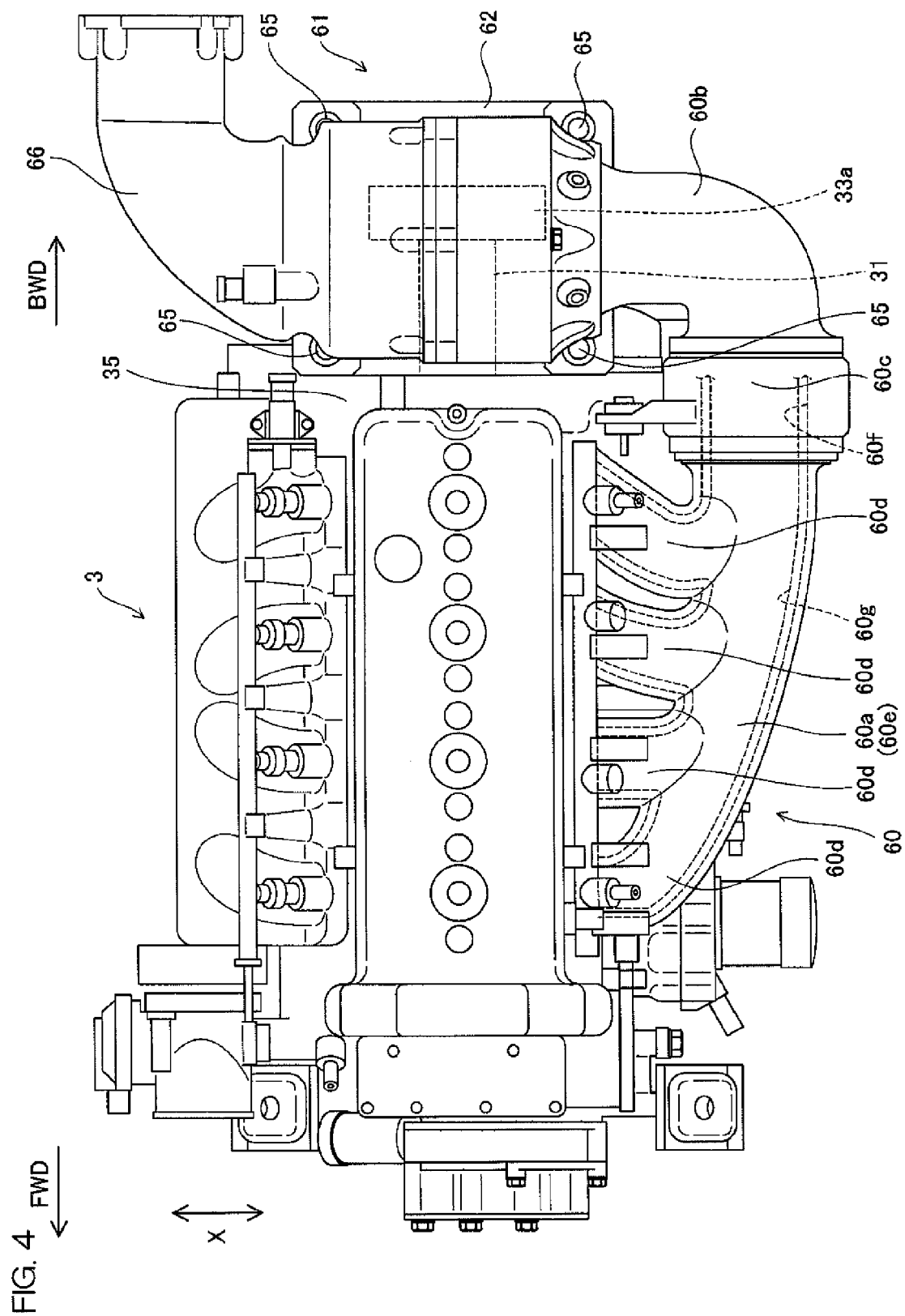
FIG. 4 is a plan view for explaining the structure in the vicinity of the engine and the catalyst unit of the water jet propulsion watercraft according to the first preferred embodiment shown in FIG. 1.

FIG. 4 is a plan view for explaining the structure in the vicinity of the engine 3. As shown in FIG. 2 and FIG. 4, the exhaust manifold unit 60, which leads out the exhaust gas discharged from the engine 3, is attached to the exhaust ports 35a (see FIG. 3) at the side of the engine 3. The exhaust manifold unit 60 is an example of a "first exhaust pipe" in a preferred embodiment of the present invention.

The exhaust manifold unit 60 includes a front piping 60a, a rear piping 60b, and a joint portion 60c. The joint portion 60c is arranged to connect the front piping 60a and the rear piping 60b. The front piping 60a is arranged to extend rearward from the side of the engine 3. The front piping 60a includes four branch portions 60d and a trunk portion 60e. The four branch portions 60d are respectively connected to the four exhaust ports 35a (see FIG. 3). The four branch portions 60d are connected to the trunk portion 60e. The trunk portion 60e is arranged such that the exhaust gas from the four branch portions 60d gathers thereat. Each of the four branch portions 60d is preferably curved to reduce an inflow resistance of the exhaust gas to be made to flow into the trunk portion 60e.

The water jacket portion 60f is arranged in the exhaust manifold unit 60 to prevent the temperature from becoming high due to flow-through of the exhaust gas. The water jacket portion 60f is an example of an "exhaust pipe cooling unit" and a "water cooling unit" according to a preferred embodiment of the present invention. The water jacket portion 60f is arranged to be connectable to the water flow channels 35b (see FIG. 3) of the engine 3. In addition, the water jacket portion 60f is arranged to surround a periphery of a gas flow channel 60g, through which the exhaust gas flows. Thus, by water flowing in from the water flow channels 35b, the exhaust manifold unit 60 can be cooled.

As shown in FIG. 2, the front piping 60a and the rear piping 60b of the exhaust manifold unit 60 are arranged to extend substantially horizontally toward the catalyst unit 61 as viewed from the side. The front piping 60a is arranged to increase in pipe diameter toward the rear. As shown in FIG. 4, the rear piping 60b is arranged to curve toward a rear surface of the cylinder head 35.

The catalyst unit 61 is provided at a downstream side of the rear piping 60b of the exhaust manifold unit 60. The catalyst unit 61 is disposed to oppose the rear surface (side surface in the BWD arrow direction) of the cylinder head 35.

Figure 5:
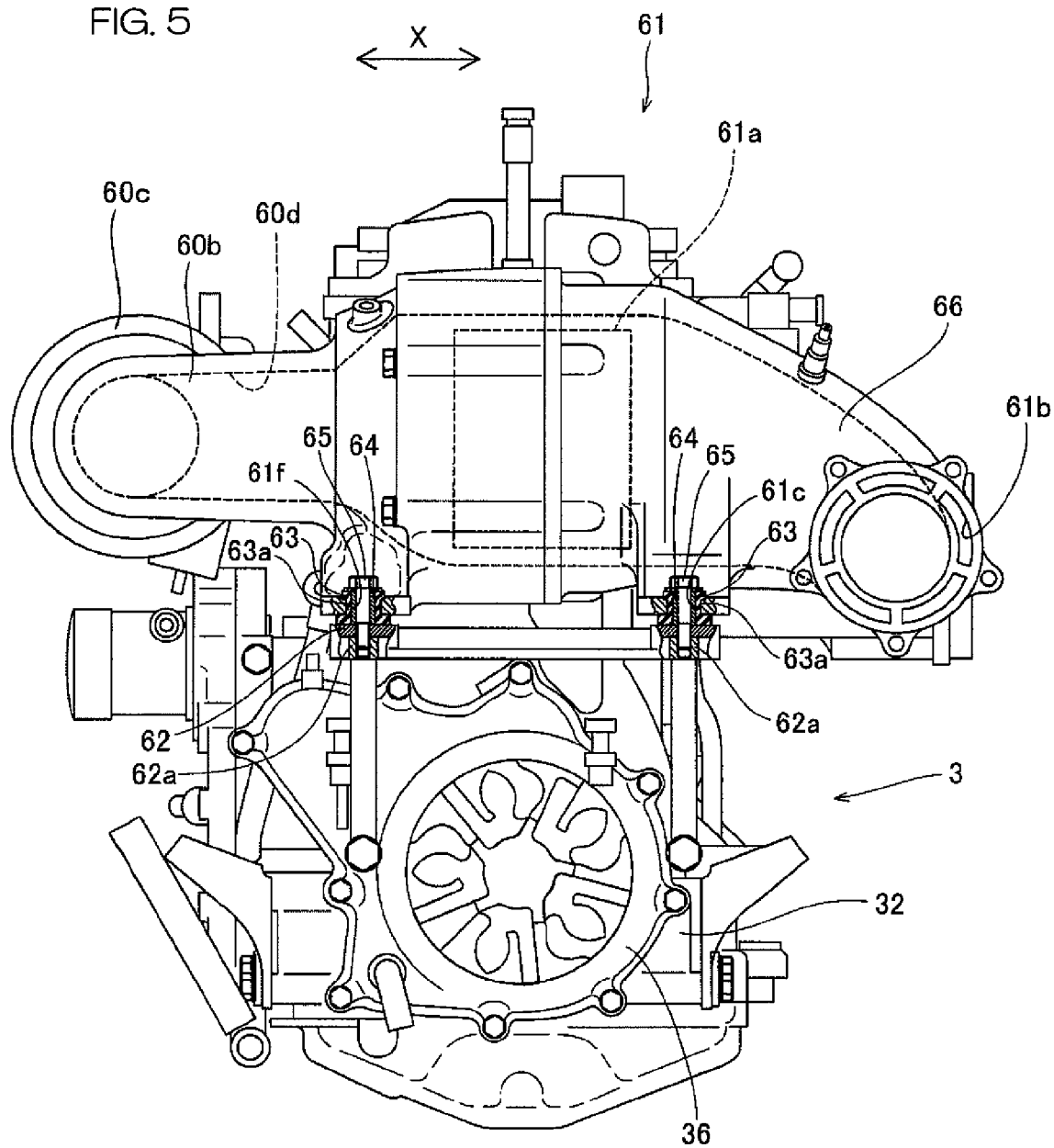
FIG. 5 is a rear view for explaining the structure in the vicinity of the engine and the catalyst unit of the water jet propulsion watercraft according to the first preferred embodiment shown in FIG. 1.
Figure 6:
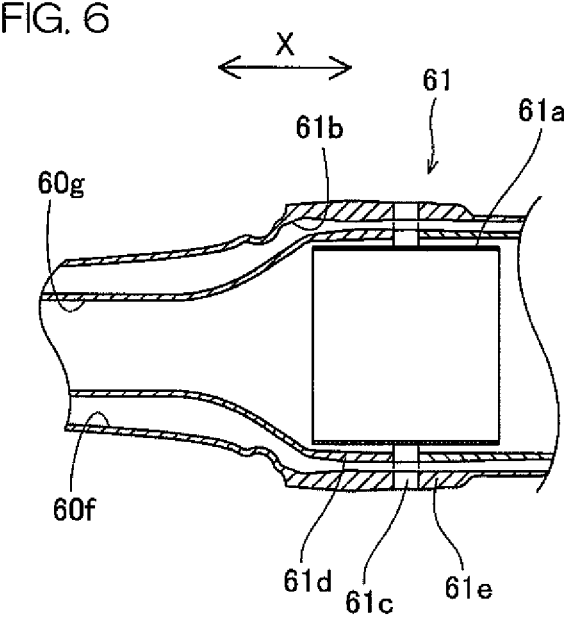
FIG. 6 is a sectional view for explaining a structure of the catalyst unit of the water jet propulsion watercraft according to the first preferred embodiment shown in FIG. 1.

FIG. 5 is a rear view for explaining the structure in the vicinity of the engine 3 and the catalyst unit 61. In addition, FIG. 6 is a sectional view for explaining the structure of the catalyst unit 61. A catalyst member 61a, which promotes reaction of components (for example, HC, CO, NOx, etc.) contained in the exhaust gas, is provided in an inside of the catalyst unit 61. The catalyst member 61a is capable of causing the components (for example, HC, CO, NOx, etc.) contained in the exhaust gas to react efficiently at a temperature not less than a predetermined temperature (approximately 500° C., for example). The catalyst member 61a is thus provided in a vicinity of the exhaust ports 35a of the engine 3 such that the temperature of the combustion gas that reaches the catalyst member 61a does not decrease.

Specifically, the catalyst unit 61 is disposed so as to be adjacent (so as to oppose) to the rear surface of the cylinder head 35 of the engine 3 as shown in FIG. 4. Further, the catalyst unit 61 is disposed so as to extend along a width direction (X direction) of the hull 2 (see FIG. 1) in a region opposing the rear surface of the cylinder head 35 of the engine 3. That is, the catalyst unit 61 is disposed between the engine 3 and the partition plate 2d (see FIG. 1) so as to oppose the rear surface of the cylinder head 35. Also, the catalyst unit 61 is disposed at substantially the same height position as the exhaust ports 35a of the cylinder head 35 as shown in FIG. 3. Also, the catalyst unit 61 is disposed above the crankshaft 31 as shown in FIG. 4. In plan view, a front side (FWD arrow direction side) portion of the catalyst unit 61 overlaps with a rear end portion of the crankshaft 31.

As shown in FIG. 6, a water jacket portion 61b is arranged in the catalyst unit 61 in substantially the same manner as in the exhaust manifold unit 60. The water jacket portion 61b is arranged to prevent the catalyst unit 61 from becoming high in temperature due to flow-through of the exhaust gas. The water jacket portion 61b is an example of the "water cooling unit" according to a preferred embodiment of the present invention. The water jacket portion 61b is arranged to be connectable to the water jacket portion 60f of the exhaust manifold unit 60. The water jacket portion 60f is arranged to surround a periphery of the catalyst member 61a, through which the exhaust gas flows. The catalyst unit 61 can thus be cooled by water flowing in from the water flow channels 35b (see FIG. 3) and via the water jacket portion 60f.

The catalyst member 61a includes a flange portion 61c. The flange portion 61c is connected to the water jacket portion 61b. A structure is thereby arranged with which water does not directly contact the catalyst member 61a. That is, the water jacket 61b is arranged to cool the inner piping 61d and an outer portion 61e that surround the catalyst member 61a.

As shown in FIG. 2 and FIG. 5, the catalyst unit 61 is supported by a support bracket 62 that is fixed to the engine 3. The support bracket 62 is an example of a "support member" according to a preferred embodiment of the present invention. The support bracket 62 is fixed to the crankcase 32 and a cover member (flywheel magneto cover) 36 of the engine 3. The cover member 36 is attached to a rear portion of the crankcase 32. As shown in FIG. 5, the catalyst unit 61 is attached to support portions 62*a* of the support bracket 62 via four rubber dampers 63 that reduce vibration during driving of the engine 3. In addition, the dampers 63 are an example of an "elastic member" according to a preferred embodiment of the present invention.

Specifically, the catalyst unit 61 is provided with four attachment holes 61*f* for attachment to the support bracket 62. Each of the four dampers 63 preferably has a cylindrical shape with an annular groove portion 63*a* provided on an outer peripheral surface, and the groove portion 63*a* engages with the corresponding attachment hole 61*f*. A metal collar 64 is fitted into an inner peripheral portion of each damper 63. Four bolts 65, for example, are respectively inserted into the collars 64 and screwed into the support portions 62*a* of the support bracket 62. The catalyst unit 61 is thereby attached to the support bracket 62.

Figure 7:
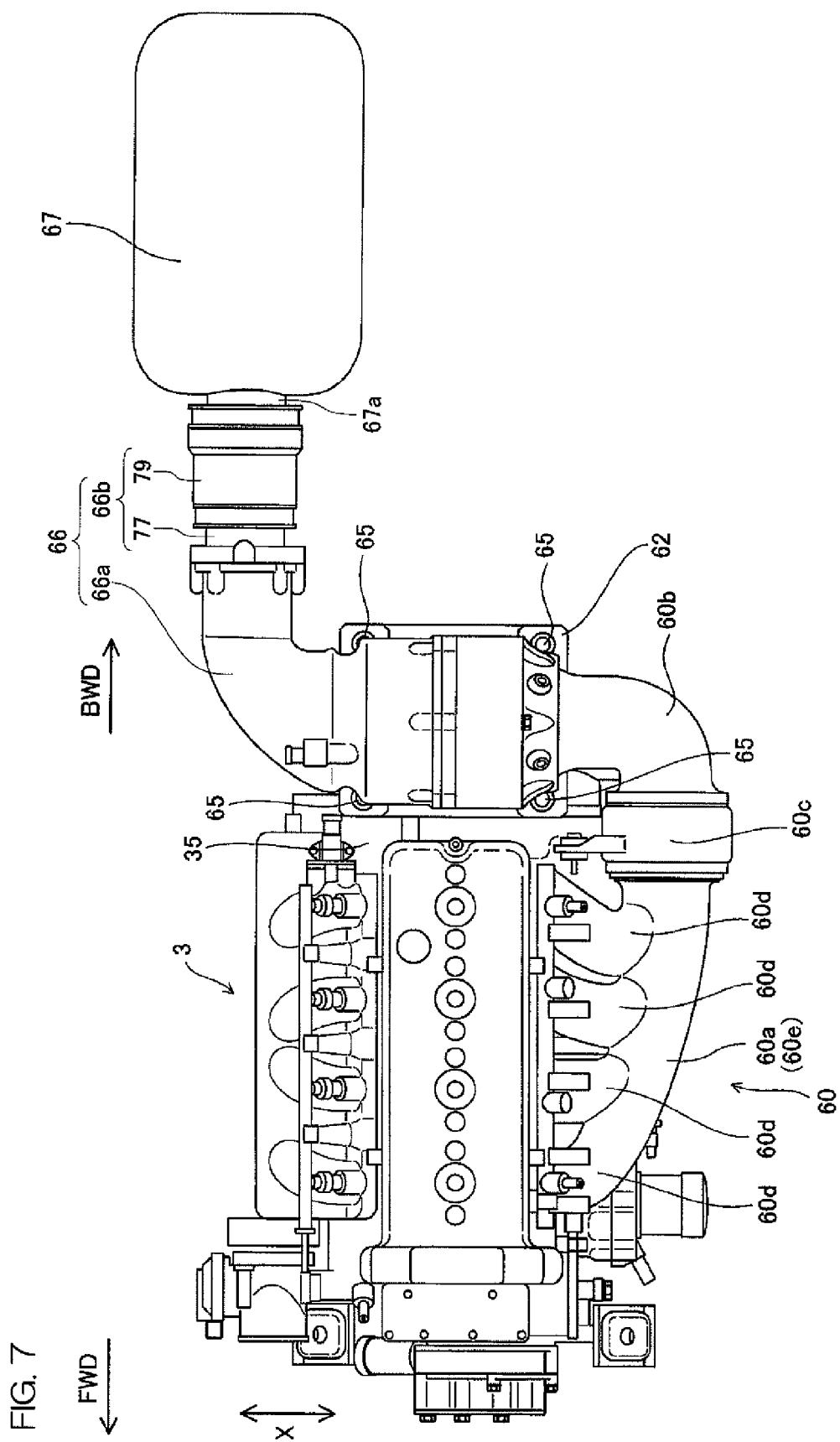
FIG. 7 is a plan view for explaining a structure in a vicinity of the catalyst unit and a water lock of the water jet propulsion watercraft according to the first preferred embodiment shown in FIG. 1.
Figure 8:
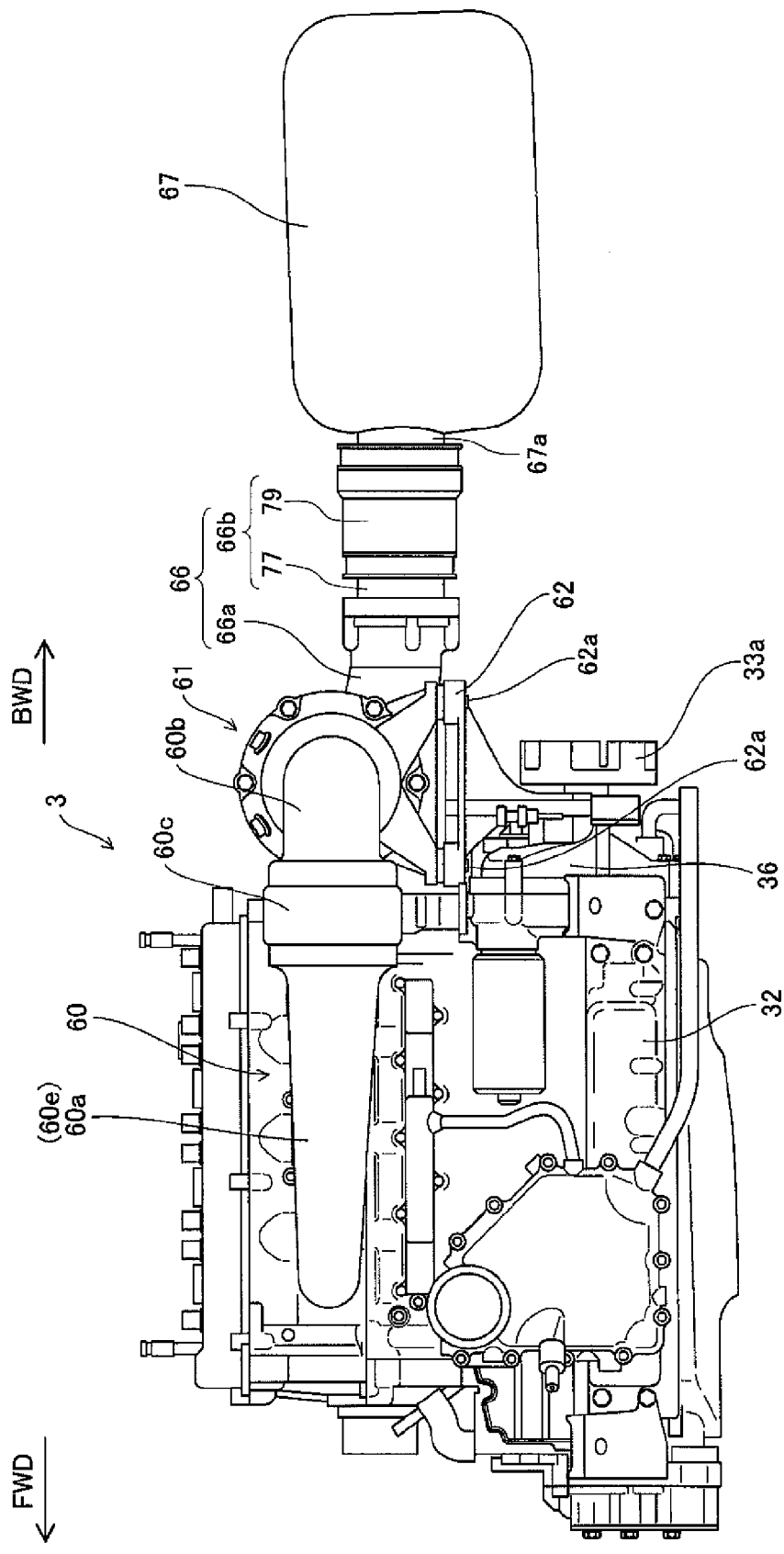
FIG. 8 is a side view for explaining the structure in the vicinity of the catalyst unit and the water lock of the water jet propulsion watercraft according to the first preferred embodiment shown in FIG. 1.

FIG. 7 is a plan view for explaining a structure of the catalyst unit 61 and an exhaust path at a downstream side thereof, and FIG. 8 is a side view of this structure. An exhaust pipe portion 66, which leads out the exhaust gas discharged from the engine 3, is connected to a downstream side of the catalyst unit 61. The exhaust pipe portion 66 is an example of a "second exhaust pipe" according to a preferred embodiment of the present invention. The exhaust pipe portion 66 is arranged to curve rearward in a vicinity of the portion of connection with the catalyst unit 61. As shown in FIG. 5 and FIG. 8, the exhaust pipe portion 66 preferably does not include a portion that inclines upward toward the downstream side. More specifically, the exhaust pipe portion 66 is arranged to incline downward toward the downstream side.

Also, as shown in FIG. 8, a water lock 67 is connected to a downstream side of the exhaust pipe portion 66. The water lock 67 is disposed such that its longitudinal direction extends in the front/rear direction. The water lock 67 is arranged to prevent water, which enters from an exhaust pipe 68 arranged to release the exhaust gas to the outside, from flowing in toward the engine 3 side. A lower portion of the water lock 67 is disposed below a lower portion of the catalyst unit 61. The exhaust pipe 68 is connected to the water lock 67 as shown in FIG. 1. The exhaust pipe 68 is connected to a pump chamber 2*f*, in which are disposed the impeller housing 52, the nozzle 53, etc. The exhaust gas discharged from the engine 3 can thereby be discharged underwater from the pump chamber 2*f*. In addition, the exhaust pipe 68 is an example of an "exhaust opening" according to a preferred embodiment of the present invention.

Figure 9:
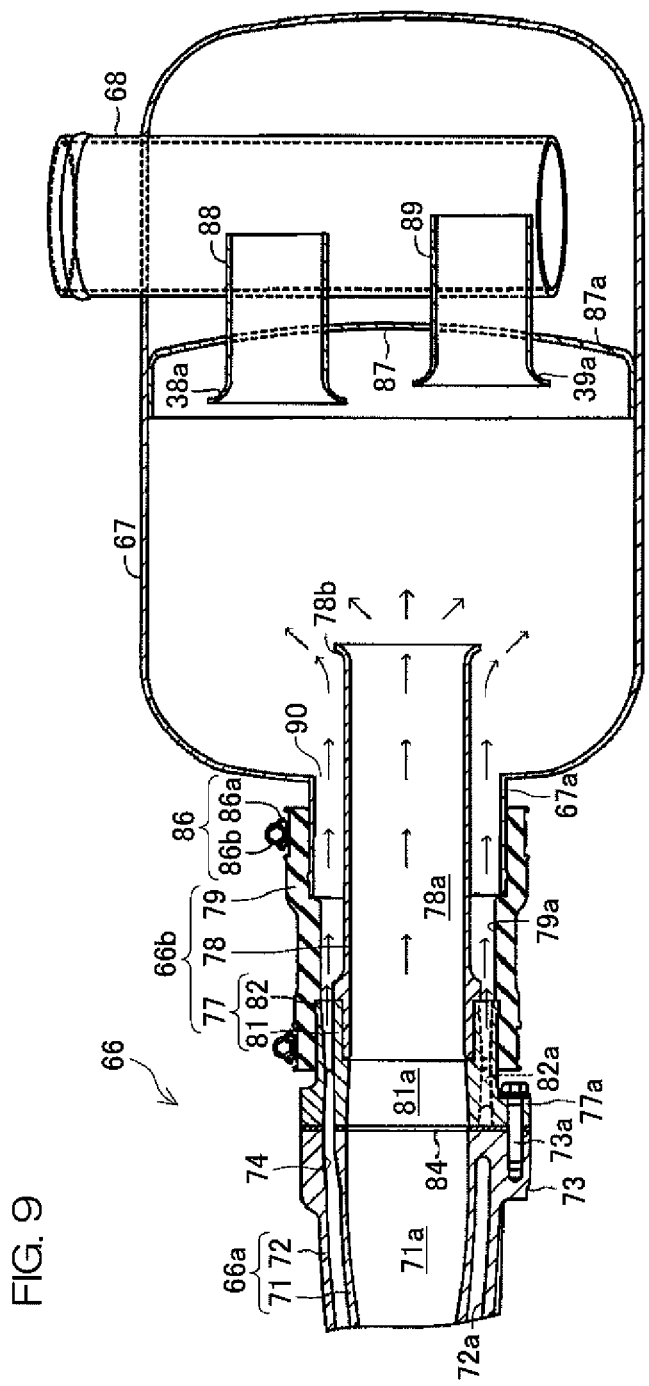
FIG. 9 is a sectional view for explaining an arrangement example of the vicinity of the water lock.

FIG. 9 is a sectional view for explaining an arrangement example of the vicinity of the water lock 67 and shows a section taken along a vertical direction. The water lock 67 preferably has a sealed, tank-shaped configuration. The exhaust pipe portion 66 at the downstream side of the catalyst unit 61 is arranged in communication with a front space of the water lock 67. The exhaust pipe 68 is inserted from a rear upper surface of the water lock 67. The exhaust pipe 68, extends upward once from the rear upper surface of the water lock 67, then extends rearward, further extends downward, and is coupled to the pump chamber 2*f* (see FIG. 1).

The exhaust pipe portion 66 includes an upstream pipe 66*a* disposed at the catalyst unit 61 side, and a connection pipe 66*b* arranged to connect the upstream pipe 66*a* and the water lock 67. The upstream pipe 66*a* is preferably constructed of, for example, from an aluminum double pipe having an inner pipe 71 and outer pipe 72. An inner peripheral surface of the inner pipe 71 defines an exhaust gas passage 71*a* arranged to pass through the exhaust gas from the engine 3. An interval between an outer peripheral surface of the inner pipe 71 and an inner peripheral surface of the outer pipe 72 defines a cooling water passage 72*a* arranged to pass through the cooling water after cooling of the engine 3, the catalyst unit 61, etc.

A plurality of screw formation portions 73, each including a screw hole, are preferably arranged at desired intervals along a circumferential direction of a downstream end portion of the upstream pipe 66*a*. A bolt 73*a* is inserted into the screw hole from a downstream end surface toward the upstream side of each screw formation portion 73. The upstream pipe 66*a* and the connection pipe 66*b* are thereby connected. Also, at a downstream end portion of the upstream pipe 66*a*, hole portions 74, each communicating from an upstream side to a downstream side, are arranged at desired intervals along the circumferential direction. The cooling water flowing from the cooling water passage 72*a* flows to the connection pipe 66*b* side via the hole portions 74.

The connection pipe 66*b* includes a tail pipe 77 connected to the downstream side of the upstream pipe 66*a*, an inner pipe 78 extending into the inside of the water lock 67 from a downstream side inner peripheral surface of the tail pipe 77, and an exhaust hose 79 extending toward the water lock 67 from a downstream side outer peripheral surface of the tail pipe 77. The tail pipe 77 preferably has a double pipe construction, which is short in an axial direction and is made up of an inner pipe 81 and an outer pipe 82. An inside of the inner pipe 81 defines an exhaust gas passage 81*a* that is in communication with an exhaust gas passage 78*a* inside the inner pipe 78. An interval between an outer peripheral surface of the inner tube 81 and an inner peripheral surface of the outer tube 82 defines a cooling water passage 82*a* that is in communication with the cooling water passage 72*a*.

Also, a plurality of screw formation portions 77*a*, each including a screw hole, are preferably arranged at desired intervals along a circumferential direction of an end portion at the upstream pipe 66*a* side of the tail pipe 77. The bolt 73*a* is inserted from a downstream side end portion toward the upstream side into the screw hole of each screw formation portion 77*a*. The upstream pipe 66*a* and the tail pipe 77 are thus connected by screwing the bolts 73*a* into the screw holes formed in the respective screw formation portions 73 and 77*a*. Symbol 84 indicates a gasket for sealing.

The inner pipe 78 is arranged, for example, from a cylindrical, aluminum alloy pipe. At a tip portion (downstream end portion) of the inner pipe 78 preferably includes a wide angle portion 78*b* with a smooth, bell-mouth shape that gradually increases in diameter toward the tip side. The inner pipe 78 is fixed to the tail pipe 77 by an upper end portion being screwed to an inner surface of a downstream side portion of the tail pipe 77. The downstream end portion of the inner pipe 78 extends into the inside of the water lock 67.

The exhaust hose 79 preferably is made of a material with flexibility, such as rubber, and has a cylindrical shape. A downstream side portion of the tail pipe 77 is fitted into an upstream end portion of the exhaust hose 79 and the two are thereby connected mutually. A cylindrical exhaust pipe connection portion 67*a* is provided at an upstream side end portion of the water lock 67. A downstream end portion of the exhaust hose 79 extends to the water lock 67 and covers an outer peripheral surface of the exhaust pipe connection portion 67*a*. A cooling water passage 79*a*, in communication with the cooling water passage 82*a*, is defined between the exhaust hose 79 and the inner pipe 78. The cooling water passage 79*a* includes a cooling water release opening 90 defined at an inner wall surface of the water lock 76. The cooling water release opening 90 is defined in an annular manner by an outer peripheral surface of the inner pipe 78 and an inner peripheral surface of the exhaust pipe connection portion 67a and puts the cooling water passage 79a in communication with an internal space of the water lock 67.

Opposing portions of the upstream side portion of the exhaust hose 79 and the tail pipe 77 and opposing portions of the downstream side portion of the exhaust hose 79 and the exhaust pipe connection portion 67a are respectively fastened together by a pair of fastening members 86 and fixed with each other. Each fastening member 86 includes, for example, a steel band 86a and a screw member 86b, which fastens together both end portions of the steel band 86a.

The water lock 67 preferably has a tank-shaped configuration preferably formed by connecting openings of two container-like members to each other by welding. The inside of the water lock 67 is partitioned into an upstream side portion and a downstream side portion by a partition 87. The partition 87 preferably includes a curved-surface plate member, with a central portion of one surface being depressed and a central portion of the other surface being protruded. The partition 87 is disposed at a slightly rear side (downstream side) relative to a center in the front/rear direction of the water lock 67 with the depressed side surface facing the upstream side portion.

In the inside of the water lock 67, a pair of partition pipes 88 and 89, spaced apart vertically by an interval, penetrates through the partition 87. Near a lower end edge of the partition 87 is formed a water drain hole 87a arranged to cause cooling water, which has become retained or accumulated in the upstream side portion of the water lock 67, flow to the downstream side portion. At a downstream side portion of the water lock 67, an upstream end side portion of the exhaust pipe 68 is penetratingly inserted through a roof portion of the water lock 67. A lower end portion of the exhaust pipe 68 extends close to a bottom portion of the water lock 67.

The exhaust pipe portion 66 preferably includes a double pipe structure that includes the inner pipes (71, 81, and 78) and the outer pipes (72, 82, and 79), and the cooling water passages (72a, 82a, and 79a) are defined between the inner pipes and the outer pipes. The exit end (79) of the outer pipe is coupled to the exhaust pipe connection portion 67a of the water lock 67, and the exit end portion (78b) of the inner pipe is inserted through the exhaust pipe connection portion 67a and protrudes inward relative to the inner wall surface of the water lock 67. In addition, outer surfaces of the exhaust pipe connection portion 67a and the inner pipe 78 define the cooling water introduction opening (90) that introduces cooling water, guided through the cooling water passages (72a, 82a, and 79a), into the water lock 67.

As described above, with the first preferred embodiment, the exhaust manifold unit 60 extends to the rear of the engine 3 from the side of the engine 3 and is directly coupled to the catalyst unit 61 that is disposed opposite the rear surface of the engine 3. An exhaust passage length from the exhaust ports 35a of the engine 3 to the catalyst unit 61 is thereby shortened. Consequently, the exhaust gas of high temperature can be guided to the catalyst unit 61, and the catalyst unit 61 can thus be activated rapidly after starting of the engine 3. Hazardous components (for example, HC, CO, NOx, etc.) contained in the exhaust from the four-stroke cycle engine that is low in fuel and oxygen contents are thereby be reacted sufficiently by the catalyst unit 61 and are cleaned up (detoxified) efficiently.

Moreover, the catalyst unit 61 is disposed opposite the rear surface of the engine 3, and a center of gravity of the water jet propulsion watercraft 1 can thereby be positioned readily at a hull center in regard to the right/left direction and toward the rear in regard to the front/rear direction. The water jet propulsion watercraft 1 that is excellent in balance in the right/left direction can thereby be provided. Both cooling of the exhaust manifold unit 60 and activation of the catalyst unit 61 can thus be achieved at the same time inside the engine room 2a with the sealed structure of narrow width, and yet the water jet propulsion watercraft 1 of excellent balance in the right/left direction is realized. Furthermore, a desired light weight characteristic is achieved at the same time because the exhaust passage length leading from the engine 3 to the catalyst unit 61 is short. Also, the need to enlarge the engine room 2a in the right/left direction is eliminated because the catalyst unit 61 is disposed to the rear of the engine. Riding comfort of the crew or passengers is thus improved.

Also, with the first preferred embodiment, the catalyst unit 61 is disposed to extend in a width direction (X direction) of the hull 2 in the region opposing the rear surface of the engine 3 as explained above. The installation space of the catalyst unit 61 can thereby be prevented from becoming large in the front/rear direction as compared to a case of disposing the catalyst unit 61 so as to extend in the front/rear direction (FWD arrow direction and BWD arrow direction) of the hull 2. Consequently, the engine 3 can be disposed more to the rear. Accordingly, the center of gravity of the water jet propulsion watercraft 1 can be disposed more to the rear, thereby more improving the motion performance of the water jet propulsion watercraft 1.

Also, with the first preferred embodiment, the water jacket portions 60f and 61b are arranged to respectively surround the peripheries of the exhaust manifold unit 60 and the catalyst unit 61 as explained above. The exhaust manifold unit 60 and the catalyst unit 61 can thereby be cooled by water, and the inside of the hull 2 (engine room 2c) can thus be prevented from heating up.

Also, with the first preferred embodiment, at least the FWD arrow direction side portion of the catalyst unit 61 opposes the rear surface (BWD arrow direction side surface) of the cylinder head 35. The catalyst unit 61 is thereby disposed at substantially the same height as the cylinder head 35 that has the exhaust ports 35a. The exhaust manifold unit 60 can thereby be disposed so as to extend rearward substantially horizontally from the exhaust ports 35a, and the exhaust manifold unit 60 can thus be made shorter in length.

Also, with the first preferred embodiment, the lower portion of the water lock 67 is disposed below the lower portion of the catalyst unit 61 as explained above. The catalyst unit 61 is thereby disposed at a higher height position than the water lock 67. The water retained in the water lock 67 can thereby be prevented from flowing into the catalyst unit 61.

Also, with the first preferred embodiment, the exit end portion (78b) of the inner pipes (71, 81, and 78), through which the exhaust gas passes, protrudes inward relative to the inner wall surface of the water lock 67, and thus a distance from the cooling water release opening 90 to the exit end portion (78b) of the inner pipes (71, 81, and 78) is long. The cooling water is thus unlikely to enter the inner pipes (71, 81, and 78) and back flow of the cooling water into the catalyst unit 61 can thereby be prevented. Moreover, the exit end of the inner pipes (71, 81, and 78) widens as it extends toward the downstream side. Back flow of the cooling water into the catalyst unit can thereby be prevented more reliably. The back flow of the cooling water can be prevented even more effectively because the exit end (78b) of the inner pipe widens outward in a bell mouth shape.

When the engine 3 is disposed as rearward as possible to dispose the center of gravity to the rear, the exhaust pipe portion 66, which defines the exhaust passage between the catalyst unit 61 and the water lock 67 that are disposed to the rear of the engine 3, is made short in pipe length. The cooling water at the exhaust pipe portion 66 thus readily flows back into the catalyst unit 61. If the back flow of the cooling water is permitted, it leads to breakage of the catalyst unit 61 and breakage of related components (for example, an oxygen concentration sensor). Cooling water back flow countermeasures, such as those explained above, are thus taken in the present preferred embodiment. Breakage of the catalyst unit 61 and the related components due to the back flow water can thereby be prevented while disposing the catalyst unit 61 at the rear of the engine 3 and disposing the center of gravity (engine) at the rear.

Also, with the first preferred embodiment, the catalyst unit 61 is supported by the support bracket 62 that is fixed to the engine 3 as explained above. The catalyst unit 61 can thereby be vibrated in synchronization with the engine 3. Consequently, repeated application of load to the exhaust manifold unit 60, which connects the engine 3 and the catalyst unit 61, and the connection portions of the exhaust manifold unit 60, etc., can be prevented.

Also, with the first preferred embodiment, the catalyst unit 61 is supported on the support bracket 62 via the dampers 63. The vibration during the driving of the engine 3 can thereby be attenuated by the dampers 63. The vibration during the driving of the engine 3 can thereby be prevented from being transmitted directly to the catalyst unit 61.

Further, with the first preferred embodiment, the exhaust manifold unit 60 preferably does not include a portion that inclines upward toward the downstream side. By this arrangement, water vapor in the exhaust gas can be prevented from condensing or accumulating at the exhaust manifold unit 60, and the water content in the exhaust gas is passed through the catalyst unit 61 in the state of water vapor. Breakage of the catalyst unit 61 and the related components can thereby be prevented.

Further, with the first preferred embodiment, the exhaust manifold unit 60 is coupled to the catalyst unit 61 upon extending horizontally rearward from the side of the engine 3. By this arrangement, the exhaust gas path length between the engine 3 and the catalyst unit 61 can be made short and, at the same time, the forming of condensed water in the exhaust manifold unit 60 can be prevented.

Also, with the first preferred embodiment, the exhaust pipe portion 66 preferably does not include a portion that inclines upward toward the downstream side as explained above. By this arrangement, water that is formed by the reaction of the components (for example, HC, CO, NOx, etc.) contained in the exhaust gas in the catalyst unit 61 can be made to flow out to the downstream side of the exhaust pipe portion 66. Retention of water in the catalyst unit 61 can thereby be prevented.

Yet, further with the first preferred embodiment, the exhaust pipe portion 66 is arranged to incline downward toward the downstream side. The water that forms or accumulates in the catalyst unit 61 can thereby flow out toward the downstream side more smoothly from the exhaust pipe portion 66. Back flow of the water into the catalyst unit 61 can thereby be prevented.

Second Preferred Embodiment

A structure of a water jet propulsion watercraft according to a second preferred embodiment of the present invention shall now be described with reference to FIG. 10 to FIG. 12. In the second preferred embodiment, an exhaust manifold unit 160 is arranged to extend downward from a side of an engine 103 and then curve toward the upper rear.

Figure 10:
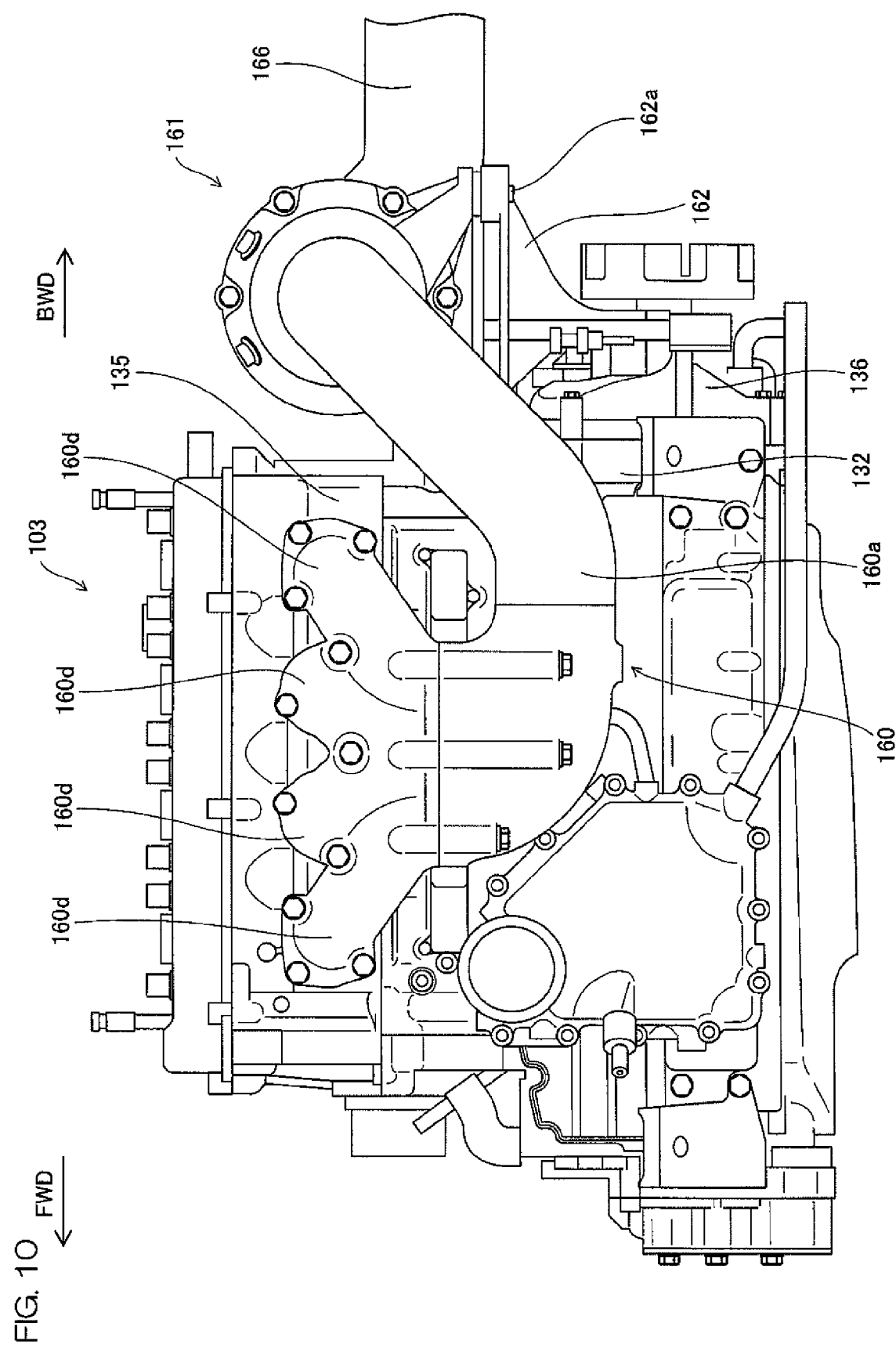
FIG. 10 is a side view for explaining a structure in a vicinity of an engine and a catalyst unit of a water jet propulsion watercraft according to a second preferred embodiment of the present invention.
Figure 11:
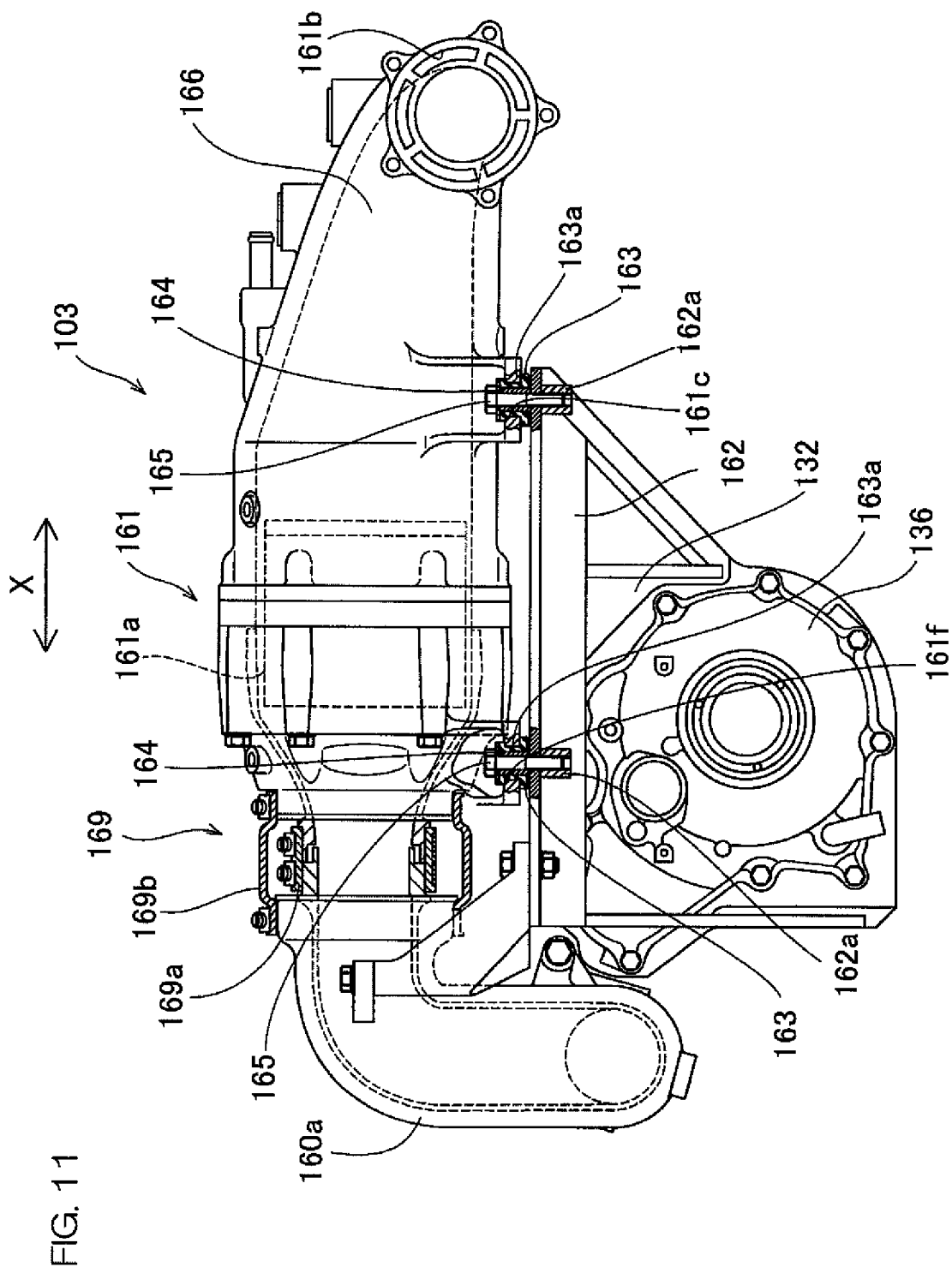
FIG. 11 is a rear view for explaining the structure in the vicinity of the engine and the catalyst unit of the water jet propulsion watercraft according to the second preferred embodiment of the present invention.

FIG. 10 is a side view for explaining a structure in a vicinity of the engine and a catalyst unit of the water jet propulsion watercraft according to the second preferred embodiment of the present invention, and FIG. 11 is a rear view thereof. FIG. 12 is a sectional view for explaining the structure in the vicinity of the catalyst unit.

As shown in FIG. 10, the exhaust manifold unit 160, which leads out the exhaust gas discharged from the engine 103, is attached to the side of the engine 103. The exhaust manifold unit 160 is an example of the "first exhaust pipe" according to a preferred embodiment of the present invention. The exhaust manifold unit 160 is arranged to extend downward from one side of the engine 103 and thereafter be curved toward the upper rear and toward the other side of the engine 103. The exhaust manifold unit 160 preferably includes four branch portions 160d and a trunk portion 160a, connected to a side surface of the cylinder head 135 of the engine 103. The trunk portion 160a is connected to the four branch portions 160d and is arranged such that the exhaust gas from the four branch portions 160d gathers thereat.

The catalyst unit 161 is provided at a downstream side of the trunk portion 160a. A catalyst member 161a, which promotes reaction of components (for example, HC, CO, NOx, etc.) contained in the exhaust gas, is provided in an inside of the catalyst unit 161 as shown in FIG. 11 and FIG. 12.

As shown in FIG. 10, the catalyst unit 161 is disposed so as to be adjacent to (so as to oppose) a rear surface of a cylinder head 135 of the engine 103. Also, the catalyst unit 161 is disposed so as to extend along a width direction (X direction) of the hull in a region opposing the rear surface of the cylinder head 135 of the engine 103.

Figure 12:
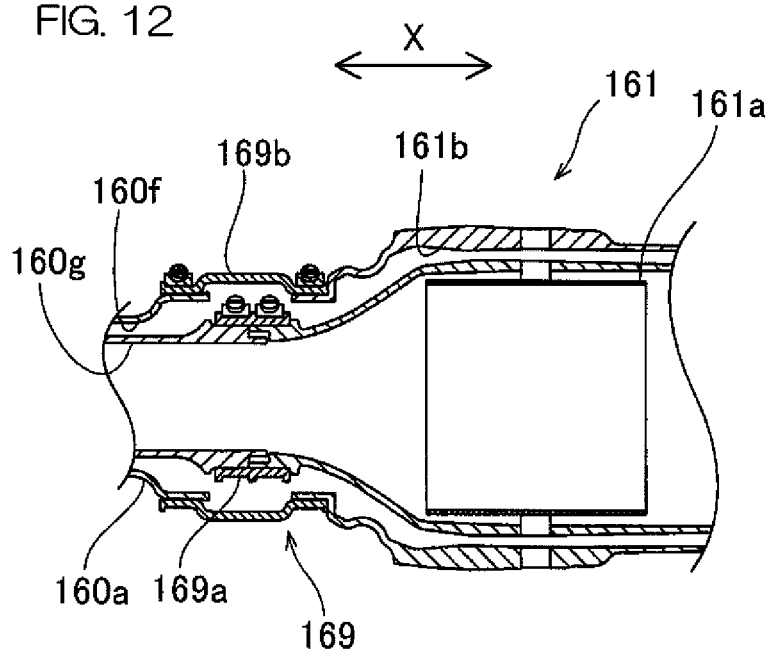
FIG. 12 is a sectional view for explaining a structure in the vicinity of the catalyst unit of the water jet propulsion watercraft according to the second preferred embodiment of the present invention.

As shown in FIG. 12, water jacket portion 161b is provided in the catalyst unit 161. The water jacket portion 161b is arranged to prevent the catalyst unit 161 from becoming high in temperature due to flow-through of the exhaust gas. The water jacket portion 161b is an example of the "water cooling unit" according to a preferred embodiment of the present invention. The water jacket portion 161b is arranged to be connectable to water jacket portion 160f of the exhaust manifold unit 160. The water jacket portion 161b is arranged to surround a periphery of a catalyst member 161a, through which the exhaust gas flows.

The exhaust manifold unit 160 and the catalyst unit 161 are connected by a connection band 169. Specifically, the connection band 169 includes an inner connection band 169a and an outer connection band 169b. The inner connection band 169a is arranged to connect a gas flow passage 160g of the exhaust manifold unit 160 with the catalyst member 161a of the catalyst unit 161. The outer connection band 169b is arranged to connect the water jacket portion 160f of the exhaust manifold unit 160 with the water jacket portion 161b of the catalyst unit 161. The connection band 169 is arranged to seal a gap between the exhaust manifold unit 160 and the catalyst unit 161. The exhaust gas and the cooling water are thereby prevented from leaking out even when the exhaust manifold unit 160 and the catalyst unit 161 become shifted due to vibration of the engine 103.

Also, with the second preferred embodiment, the catalyst unit 161 is preferably supported by a support bracket 162 that is fixed to the engine 103 as shown in FIG. 11. The support bracket 162 is an example of the "support member" according to a preferred embodiment of the present invention. The support bracket 162 is fixed to a crankcase 132 and a cover member (e.g., flywheel magneto cover) 136 of the engine 103. The cover member 136 is attached to a rear portion of the crankcase 132.

The catalyst unit 161 is attached to support portions 162a of the support bracket 162 preferably via four rubber dampers 163, for example, which are arranged to reduce vibration during driving of the engine 103. The dampers 163 are an example of the "elastic member" according to a preferred embodiment of the present invention.

Specifically, the catalyst unit 161 is provided with four attachment holes 161f for attachment to the support bracket 162. Each of the four dampers 163 preferably has a cylindrical shape with an annular groove portion 163a provided on an outer peripheral surface, and the groove portion 163a engages with the corresponding attachment hole 161f. A metal collar 164 is fitted into an inner peripheral portion of each damper 163. Four bolts 165, for example, are respectively inserted into the collars 164 and screwed into the support portions 162a of the support bracket 162. The catalyst unit 161 is thereby attached to the support bracket 162.

An exhaust pipe portion 166, which leads out the exhaust gas discharged from the engine 103, is connected to a downstream side of the catalyst unit 161. The exhaust pipe portion 166 is an example of a "second exhaust pipe" according to a preferred embodiment of the present invention.

Other arrangements and effects of the second preferred embodiment are substantially the same as those of the first preferred embodiment described above.

Other Preferred Embodiments

It is to be understood that the preferred embodiments disclosed herein are in all respects illustrative and not restrictive. The scope of the present invention is defined by the claims and not by the preceding description of the preferred embodiments, and all changes that fall within the metes and bounds of the claims or equivalence of such metes and bounds are therefore intended to be embraced by the claims.

For example, although with each of the first and second preferred embodiments, an example where the catalyst unit is preferably arranged so as to be adjacent to the rear surface of the cylinder head of the engine has been described, the present invention is not restricted thereto. For example, instead of holding the catalyst unit by the support bracket that is fixed to the engine, the catalyst unit may be fixed to an attachment bracket that is attached to a portion other than the engine. Specifically, a catalyst unit 261 may be attached via an attachment bracket 262 to a partition plate 202d of a hull 202 as in a first modification example shown in FIG. 13.

Figure 13:
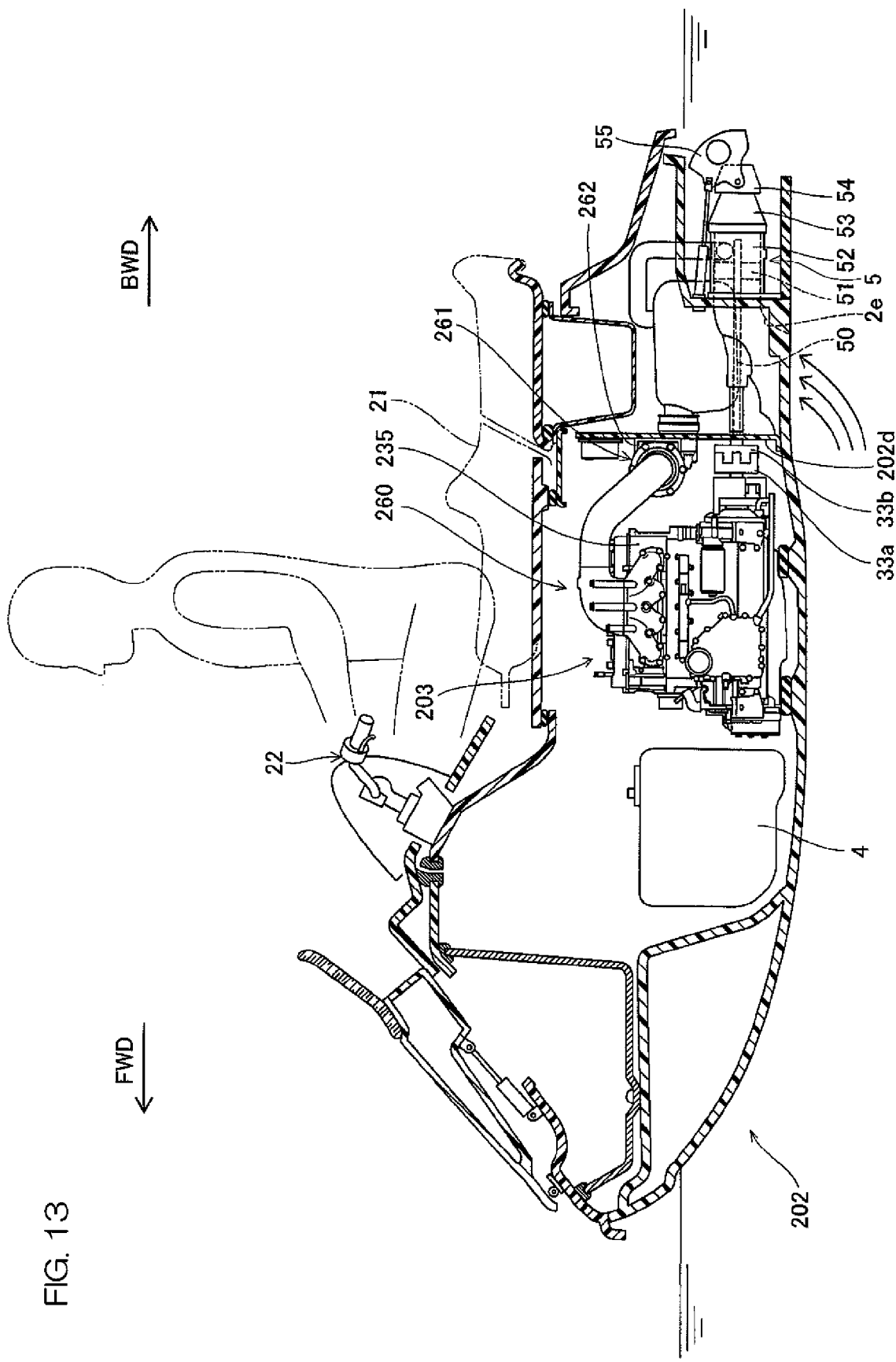
FIG. 13 is a sectional view of an overall arrangement of a water jet propulsion watercraft according to a first modification example of preferred embodiments of the present invention.

As shown in FIG. 13, in the first modification example, an exhaust manifold unit 260, which leads out the exhaust gas discharged from an engine 203, is attached to a side of the engine 203. The exhaust manifold unit 260 is an example of the "first exhaust pipe" according to a preferred embodiment of the present invention. The exhaust manifold unit 260 is arranged to extend upward from one side of the engine 203 and thereafter be curved toward the lower rear and toward the other side of the engine 203. The catalyst unit 261 is provided at a downstream side of the exhaust manifold unit 260. The catalyst unit 261 is attached via the attachment bracket 262 to the partition plate 202d so as to oppose a rear surface of a cylinder head 235 between the engine 203 and the partition plate 202d.

Also, although with the first preferred embodiment, an example where the trunk portion of the exhaust manifold unit is preferably arranged to increase in pipe diameter toward the rear has been described, the present invention is not restricted thereto. For example, as in a second modification example shown in FIG. 14, an exhaust manifold unit 360 may be arranged to be substantially fixed in its pipe diameter.

Figure 14:
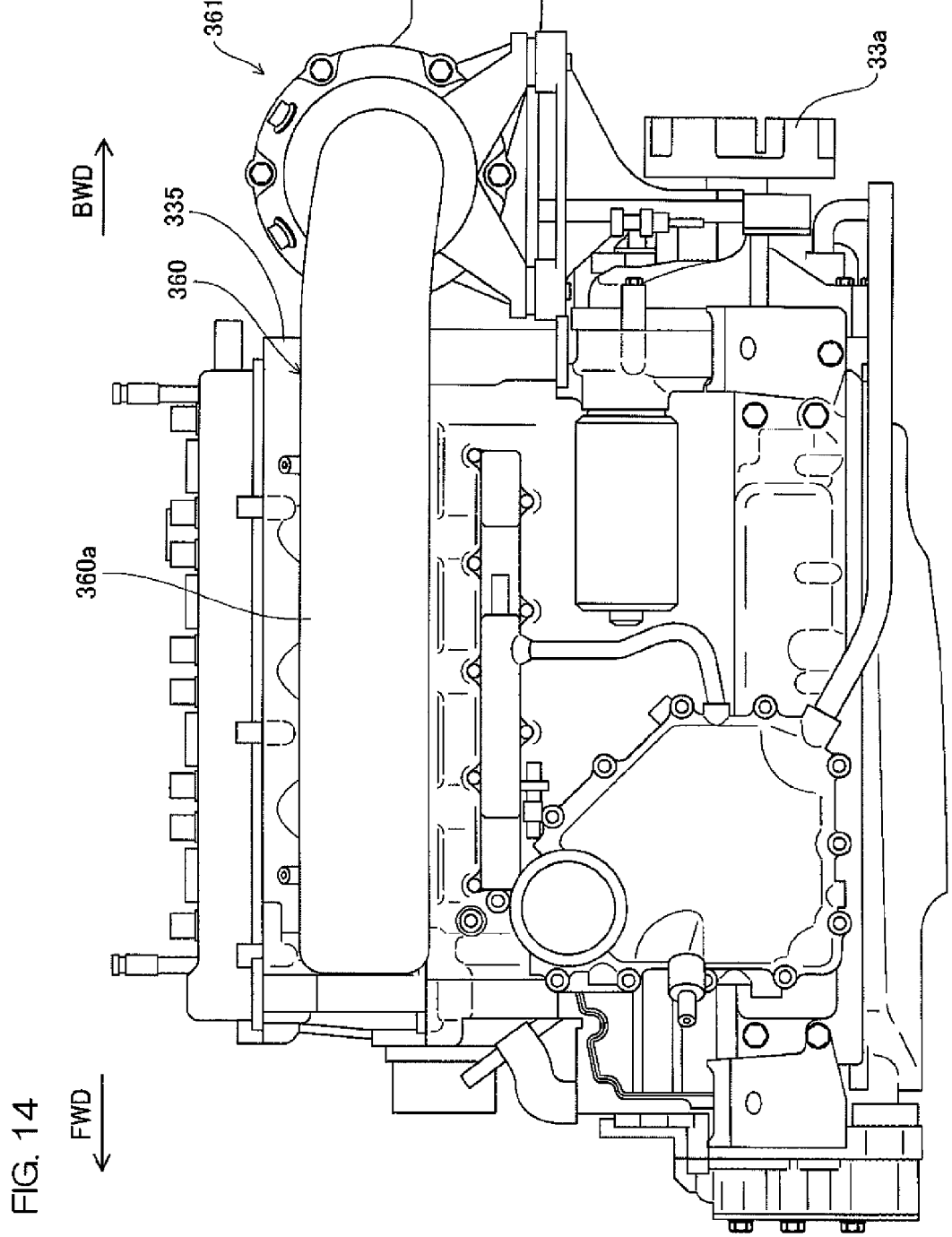
FIG. 14 is a side view for explaining a structure in a vicinity of an engine and a catalyst unit of a water jet propulsion watercraft according to a second modification example of preferred embodiments of the present invention.

Specifically, in the second modification example, a trunk portion 360a of the exhaust manifold unit 360 is arranged to extend substantially horizontally toward a catalyst unit 361 as viewed from a side as shown in FIG. 14. The catalyst unit 361 is disposed to oppose a rear surface (BWD arrow direction side surface) of a cylinder head 335. The trunk portion 360a is arranged to be substantially fixed in pipe diameter. The exhaust manifold unit 360 is an example of the "first exhaust pipe" according to a preferred embodiment of the present invention.

Also, although with the second preferred embodiment, an example where the exhaust manifold unit preferably extends downward from one side of the engine and thereafter is curved toward the upper rear and toward the other side of the engine has been described, the present invention is not restricted thereto. For example, an exhaust manifold unit 460 may be arranged to extend upward from one side of an engine 403 and thereafter be curved toward the lower rear and toward the other side of the engine 403 as in a third modification example shown in FIG. 15.

Figure 15:
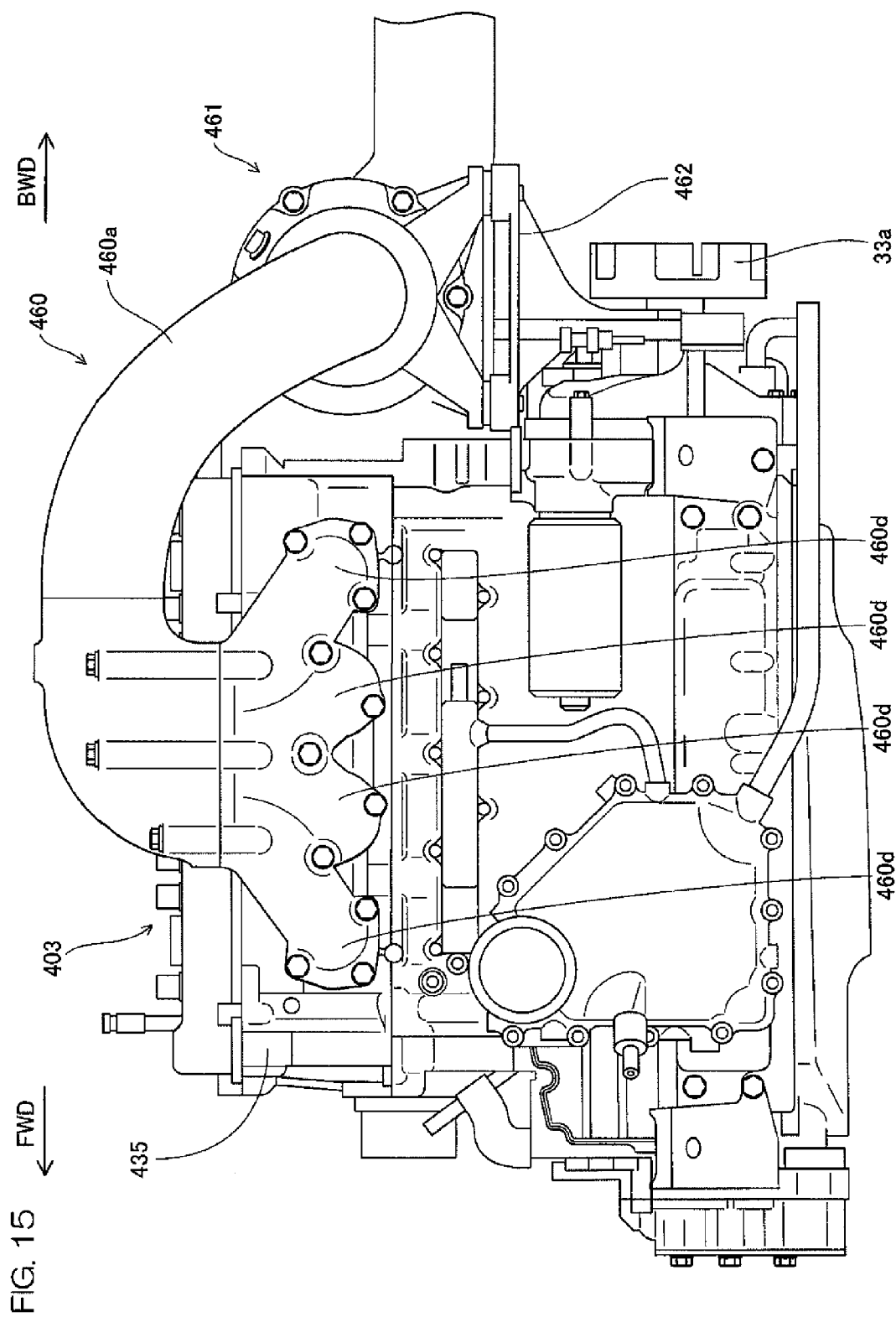
FIG. 15 is a side view for explaining a structure in a vicinity of an engine and a catalyst unit of a water jet propulsion watercraft according to a third modification example of preferred embodiments of the present invention.

In the third modification example, the exhaust manifold unit 460, which leads out the exhaust gas discharged from the engine 403, is attached to the side of the engine 403 as shown in FIG. 15. The exhaust manifold unit 460 is an example of the "first exhaust pipe" according to a preferred embodiment of the present invention. The exhaust manifold unit 460 is arranged to extend upward from one side of the engine 403 and thereafter be curved toward the lower rear and toward the other side of the engine 103. The exhaust manifold unit 460 includes four branch portions 460d, connected to a side surface of a cylinder head 435 of the engine 403, and a trunk portion 460a. The trunk portion 460a is connected to the four branch portions 460d and is arranged such that the exhaust gas from the four branch portions 460d gathers thereat. A catalyst unit 461 is provided at a downstream side of the trunk portion 460a of the exhaust manifold unit 460. The catalyst unit 461 is attached to the engine 403 via a support bracket 462. The support bracket 462 is an example of the "support member" according to a preferred embodiment of the present invention.

Also, although with each of the first and second preferred embodiments, an example where the catalyst unit is preferably disposed at a portion opposing the rear surface of the cylinder head of the engine has been described, the present invention is not restricted thereto. For example, the catalyst unit may be disposed at a portion that opposes a rear surface of the crankcase or a cylinder block instead of the rear surface of the cylinder head of the engine.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The present application corresponds to Japanese Patent Application No. 2009-093914 filed in the Japan Patent Office on Apr. 8, 2009, and the entire disclosure of the application is incorporated herein by reference.

What is claimed is:

1. A water jet propulsion watercraft comprising:
   a hull including a sealed engine room;
   an engine installed in the engine room, the engine including a rear surface facing a rear direction of the water jet propulsion watercraft;
   a jet propulsion unit arranged to be driven by the engine so as to suck in water from around the hull and jet the water;
   a seat disposed above the engine room;

a first exhaust pipe attached to a side of the engine inside the engine room, extending rearward from the side of the engine, and arranged to guide exhaust gas discharged from the engine;

an exhaust pipe cooling unit arranged to cool the first exhaust pipe; and a catalyst unit connected to the first exhaust pipe, disposed inside the engine room so as to oppose the rear surface of the engine such that at least a portion of the catalyst unit overlaps with the rear surface of the engine when the engine is viewed from the rear direction of the water jet propulsion watercraft, disposed to extend in a width direction of the hull in a region that opposes the rear surface of the engine, and arranged to promote reaction of components contained in the exhaust gas.

2. The water jet propulsion watercraft according to claim 1, further comprising a water cooling unit arranged to surround a periphery of the catalyst unit so as to cool the catalyst unit by water.

3. The water jet propulsion watercraft according to claim 1, wherein the engine includes a cylinder head, and at least a portion of the catalyst unit is disposed so as to oppose a rear surface of the cylinder head.

4. The water jet propulsion watercraft according to claim 1, further comprising:

a second exhaust pipe connected to the catalyst unit and arranged to guide the exhaust gas that has been discharged from the engine and has passed through the first exhaust pipe and the catalyst unit; and a water lock connected to a downstream side of the second exhaust pipe and arranged to prevent water, entering from an exhaust opening that releases the exhaust gas to an outside of the hull, from flowing in toward the engine side; wherein a lower portion of the water lock is disposed below a lower portion of the catalyst unit.

5. The water jet propulsion watercraft according to claim 4, wherein the second exhaust pipe includes a double pipe structure that includes an inner pipe and an outer pipe, a cooling water passage is defined between the inner pipe and the outer pipe;

the water lock includes an exhaust pipe connection portion arranged to be coupled to the second exhaust pipe;

an exit end of the outer pipe is coupled to the exhaust pipe connection portion, an exit end portion of the inner pipe is inserted through the exhaust pipe connection portion and protrudes inward relative to an inner wall surface of the water lock; and the exhaust pipe connection portion and an outer surface of the inner pipe define a cooling water introduction opening arranged to introduce cooling water, guided through the cooling water passage, into the water lock.

6. The water jet propulsion watercraft according to claim 5, wherein the exit end of the inner pipe widens as it extends toward the downstream side.

7. The water jet propulsion watercraft according to claim 1, further comprising a supporting member fixed to the engine and arranged to support the catalyst unit.

8. The water jet propulsion watercraft according to claim 7, further comprising an elastic member arranged to decrease vibration during driving of the engine, wherein the catalyst unit is supported on the supporting member via the elastic member.

9. The water jet propulsion watercraft according to claim 7, wherein the engine further includes a crankcase, and the supporting member is fixed to the crankcase.

10. The water jet propulsion watercraft according to claim 1, wherein the first exhaust pipe does not include a portion that inclines upward toward the downstream side.

11. The water jet propulsion watercraft according to claim 1, wherein the first exhaust pipe is coupled to the catalyst unit upon extending horizontally rearward from the side of the engine.

12. The water jet propulsion watercraft according to claim 1, further comprising a second exhaust pipe connected to the catalyst unit and arranged to guide the exhaust gas that has been discharged from the engine and has passed through the first exhaust pipe and the catalyst unit, wherein the second exhaust pipe does not include a portion that inclines upward toward the downstream side.

13. The water jet propulsion watercraft according to claim 12, wherein the second exhaust pipe is arranged to incline downward toward the downstream side.

14. The water jet propulsion watercraft according to claim 1, further comprising a second exhaust pipe connected to the catalyst unit and arranged to guide the exhaust gas that has been discharged from the engine and has passed through the first exhaust pipe and the catalyst unit, wherein the first exhaust pipe is coupled to the catalyst unit upon extending horizontally rearward from the side of the engine, and the second exhaust pipe is arranged to incline downward toward the downstream side.

15. The water jet propulsion watercraft according to claim 1, wherein the engine includes a crankshaft arranged so as to extend in the front/rear direction, and the catalyst unit is arranged such that at least a portion thereof overlaps with a rear end portion of the crankshaft in a plan view of the water jet propulsion watercraft.

16. The water jet propulsion watercraft according to claim 1, wherein the hull includes a partition plate arranged to partition an inside of the hull in a front/rear direction, and the catalyst unit is disposed between the engine and the partition plate so as to oppose a rear surface of the engine.

17. The water jet propulsion watercraft according to claim 1, wherein the engine is a four-stroke cycle engine.

18. The water jet propulsion watercraft according to claim 16, wherein the catalyst unit is fixed to the partition plate.

* * * * *